United States Patent [19]

Albee

[11] 4,360,073

[45] Nov. 23, 1982

[54] OFF ROAD VEHICLES WITH AUTOMATIC INFLATION CONTROL SYSTEM

[76] Inventor: William H. Albee, 1524 Spring Brook Rd., Walnut Creek, Calif. 94596

[21] Appl. No.: 194,284

[22] Filed: Oct. 6, 1980

Related U.S. Application Data

[62] Division of Ser. No. 866,773, Jan. 3, 1978, abandoned.

[51] Int. Cl.³ .................. B60K 17/36; B60K 17/34
[52] U.S. Cl. .................. 180/74; 152/173; 152/354 R; 152/361 R; 152/417; 152/DIG. 18; 280/DIG. 7
[58] Field of Search ....... 152/415, 416, 417, DIG. 18, 152/167, 168, 170, 173, 185, 187, 208, 9, 352 R, 354 R, 361 R, DIG. 5, 356 R, 330 R, 185.1; 180/74; 280/DIG. 7; 156/187, 215, 218, 123 R; 137/627.5

[56] References Cited

U.S. PATENT DOCUMENTS

| | | | |
|---|---|---|---|
| Re. 24,272 | 2/1957 | Albee | 180/9 |
| 2,802,541 | 8/1957 | Albee | 152/9 UX |
| 2,952,468 | 9/1960 | Albee | 280/58 |
| 2,990,026 | 6/1961 | Albee | 180/74 |
| 3,074,455 | 1/1963 | Richey | 152/352 |
| 3,528,679 | 9/1970 | Gant | 152/416 X |
| 3,744,585 | 7/1973 | Holand, Sr. | 180/74 |
| 4,007,801 | 2/1977 | Vincent et al. | 180/74 |

Primary Examiner—Edward C. Kimlin
Assistant Examiner—Thomas Bokan
Attorney, Agent, or Firm—Donald C. Feix

[57] ABSTRACT

An off road vehicle of the kind having fluid-distensible bag rollers for supporting the vehicle load uses bag rollers which are constructed to afford maximum flexibility in both the walls and tread and which are also constructed to be dynamically balanced.

The vehicle also incorporates suspensions which effectively dampen oscillation of the bag rollers to facilitate and to permit high speed operations of the vehicle across rough terrain.

A top drive roller is associated with a bag roller in certain embodiments of the off road vehicle in ways which minimize bag wear.

Specific bag constructions are provided for improved operation of the off road vehicle for on-highway use.

The vehicle includes two frame sections which are connected to permit frame (yaw) steering and swiveling (roll) between the two sections while preventing a bending between the frame sections (pitch) to thereby provide a strong back mode of operation. When equipped with 4 bags on each frame, the vehicle permits increased speed over rough terrain.

The bag roller in a fixed position serves as a transport device for supporting and moving material having uneven and/or fragile surfaces and, in a specific embodiment, is mounted in a support for use as a transportation element in a conveyor system, or as a forceful puller for lineal objects, such as pipelines, accommodating uneven dimensions.

3 Claims, 25 Drawing Figures

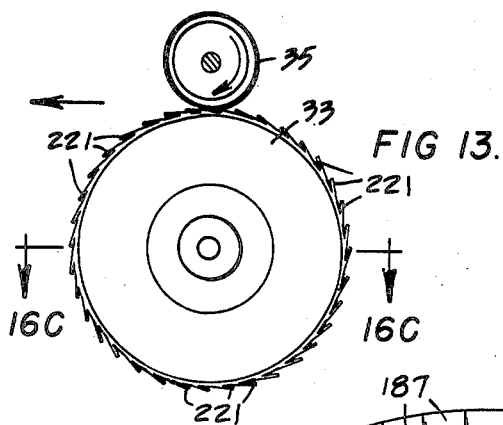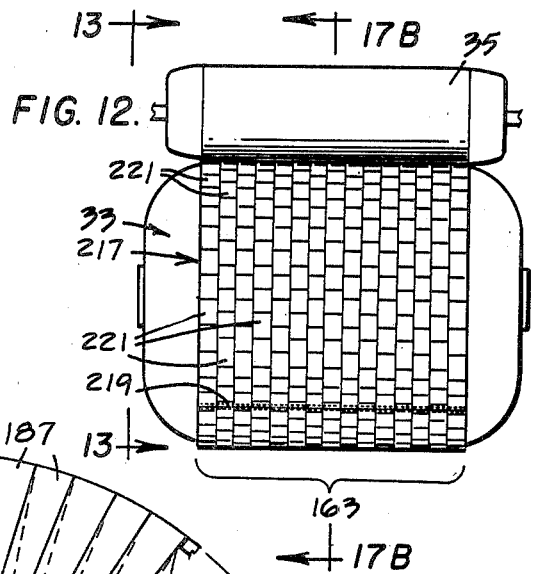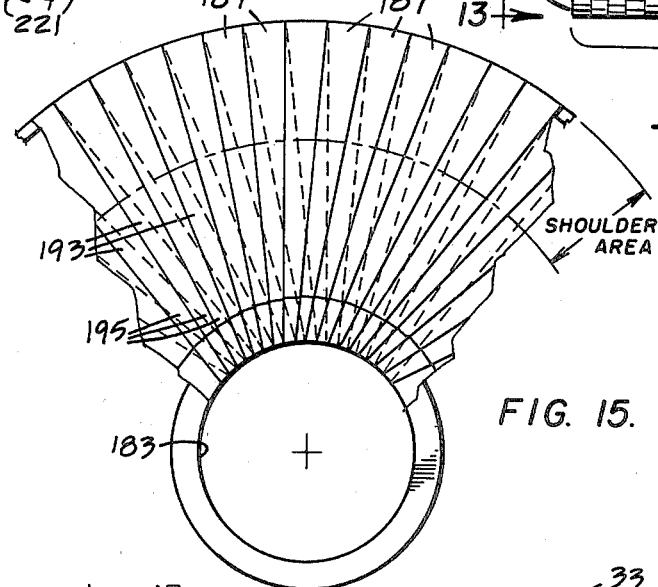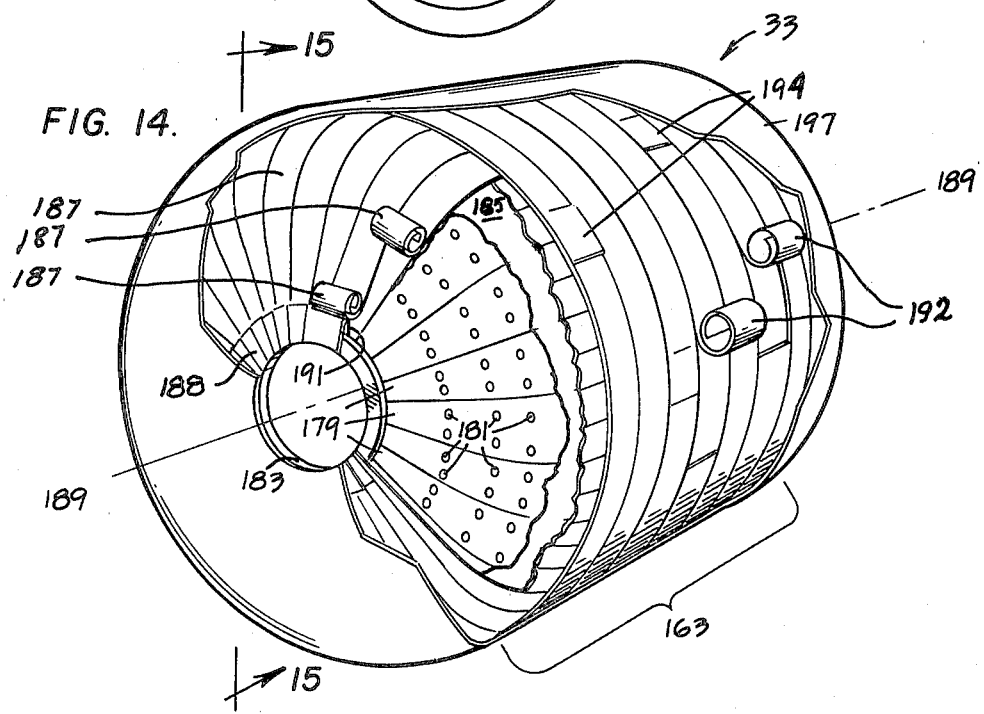

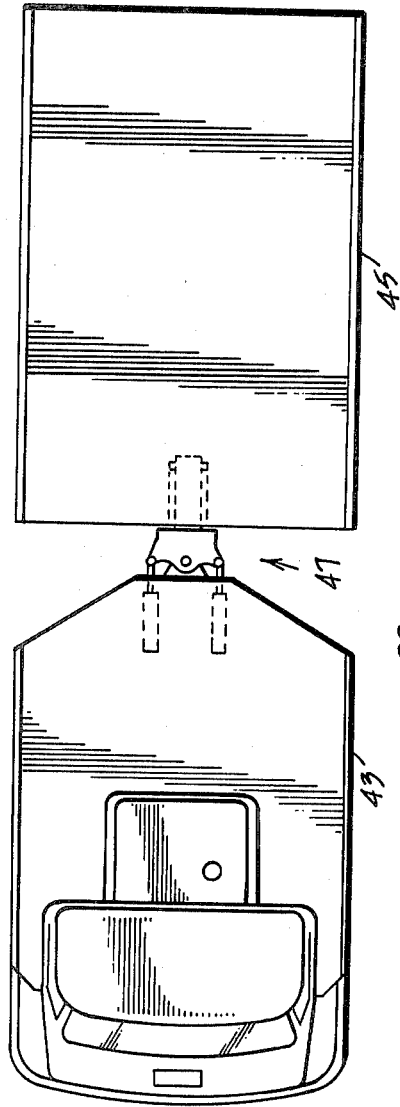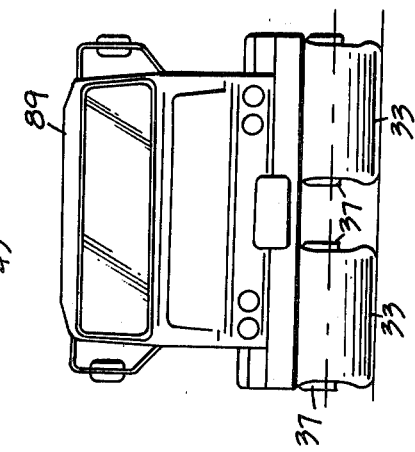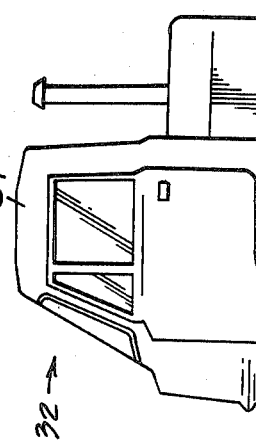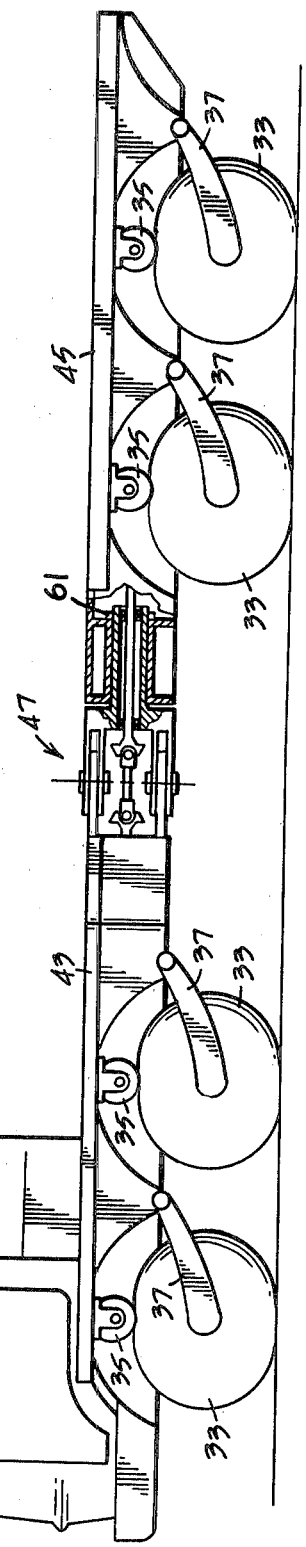

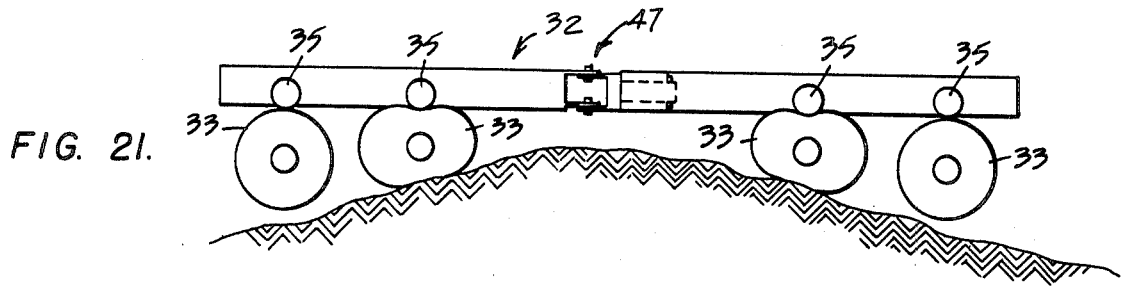
FIG. 21.
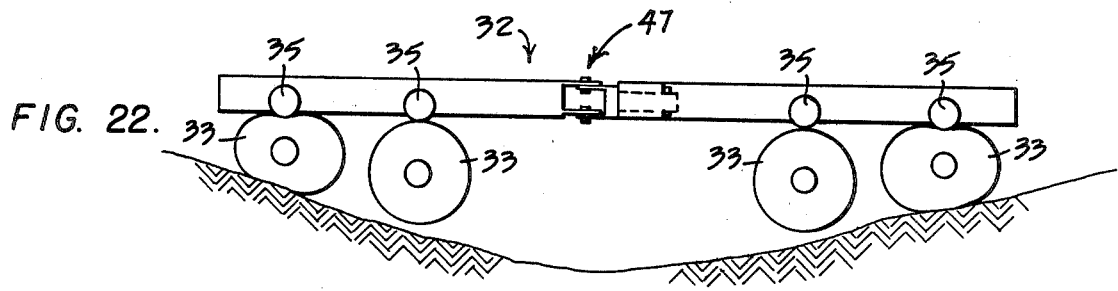
FIG. 22.
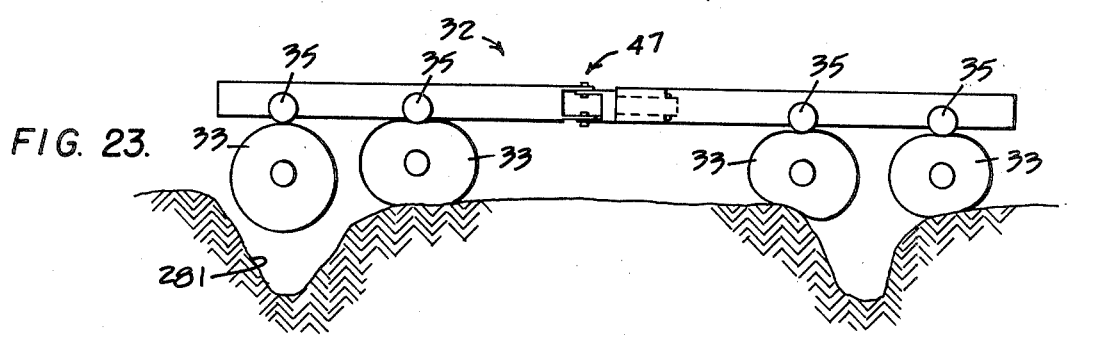
FIG. 23.
FIG. 25.
FIG. 24.
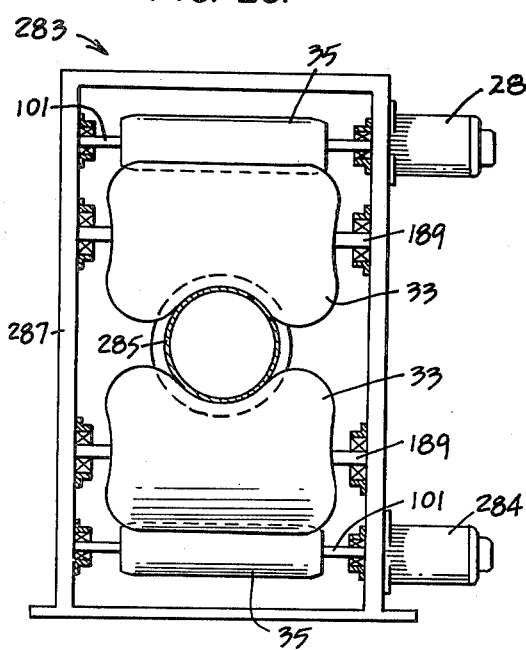
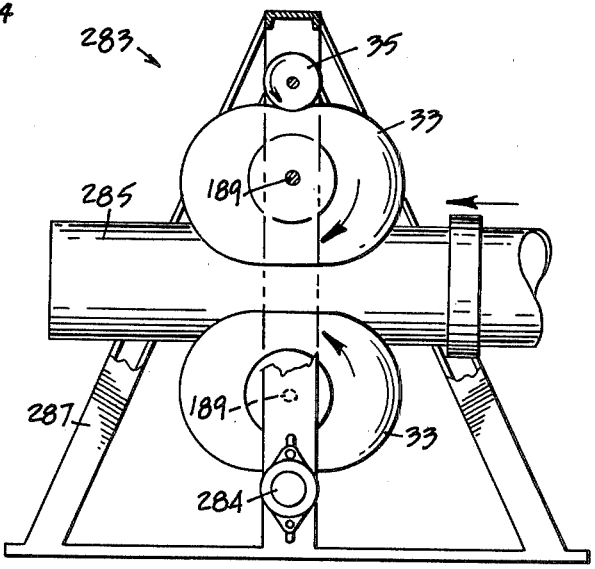

OFF ROAD VEHICLES WITH AUTOMATIC INFLATION CONTROL SYSTEM

This application is a division of parent application Ser. No. 866,773 filed Jan. 3, 1978 now abandoned and entitled "Off Road Vehicles" and claims the benefit of the filing date of the parent application.

CROSS-REFERENCE TO RELATED PATENTS

This invention relates to fluid-distensible, load sustaining bag rollers and to off road vehicles of the kind disposed in my prior U.S. Pat. Re-issue No. 24,272 (formerly U.S. Pat. No. 2,714,011), and prior U.S. Pat. Nos. 2,802,541; 2,952,468; and 2,990,026.

BACKGROUND OF THE INVENTION

Fluid-distensible, load sustaining bag rollers and vehicles incorporating such bag rollers (as disclosed in my prior U.S. Patents referred to above) provide a number of important operating advantages for off-road operation.

It is a primary objective of the present invention to further improve vehicles of this kind and the bag rollers and related suspension systems to achieve improvements in operation, particularly for increased speed in off-road operations.

It is a specific object of the present invention to construct the bag roller in a way that:

(1) provides maximum flexibility in the walls and tread area of the bag roller and to thereby maximize the ability of the bag roller to conform to the terrain with minimum disturbance of the terrain;

(2) provides maximum dynamic bag balancing for increased speeds; and (3) eliminates carcass restraining areas to minimize carcass stresses and to thus provide increased bag life.

It is another specific object of the present invention to incorporate suspension systems in the vehicles to dampen and to minimize bag roller oscillation so that high speeds of operation can be sustained.

It is a further specific object of the present invention to construct off road vehicles having four, or more, bag rollers associated with each of two frame sections and with frame sections that will swing and swivel with respect to one another to provide frame steering and to provide a strong-back construction which does not permit any longitudinal bending of one frame section with respect to another and which permits increased speed while the vehicle is traversing minor humps or ditches and rock strewn terrain.

SUMMARY OF THE PRESENT INVENTION

A fluid-distensible, load sustaining bag roller constructed in accordance with the present invention provides maximum flexibility in the walls and tread area so as to permit an exceptionally high degree of conformance with the terrain without disturbing the terrain itself. The particular bag roller construction also permits increased speed.

The bag roller also has a construction which is specially related to an associated drive roller so as to minimize scuffing between the bag roller and the drive roller and so reduce bag roller wear to a minimum.

The bag roller has a carcass which includes longitudinally extending cords individually disposed so as to terminate substantially radially to the longitudinal axis of the bag roller.

The bag carcass also includes at least one layer of circumferential cords in a mid-section, tread portion of the bag roller in which each circumferential cord is disposed substantially entirely within an individual plane extending perpendicular to the longitudinal axis of the bag roller.

This precise alignment of longitudinal and circumferential cords in the carcass provides maximum strength with maximum flexibility.

Additionally, the length of each longitudinal cord is made equal to the length of each of the other longitudinal cords, and this contributes significantly to a dynamic balancing of the bag roller in operation at relatively high speeds of rotation of the bag roller.

When multiple plies of longitudinal cords are used, all layers of longitudinal cords are contiguous, and all layers of circumferential cords are also contiguous without any interpersing of layers of longitudinal cords between layers of circumferential cords. This construction minimizes cord strains during sharp bends of the bag carcass caused by use of multiple plies. It also permits the maximum length of the footprint (the length of the part of the bag roller engaged with the terrain as measured in the direction of vehicle motion) to be maximized. It also provides a maximum amount of wrap-around between the top of the bag roller and a related top drive roller to thereby maximize the area of frictional contact between the bag roller and the top drive roller.

In some embodiments a slip-on tread is mounted on the outer surface of the bag roller. In one embodiment the slip-on tread includes articulated grouser elements for increasing traction in operation on certain types of terrain, such as slippery melting snow.

In some embodiments of the invention a top roller is engaged with the upper surface of the bag roller to apply the vehicle load to the top of the bag roller or to dampen oscillations of the bag roller. The top roller is positioned centrally and parallel to the axis of rotation of the bag roller and in the preferred form is geometrically proportioned in all elements of the circumference of the top roller to corresponding circumferences of the bag roller to thereby eliminate substantially all relative slipping or movement of the top surface of the bag roller with respect to the top roller in a circumferential direction.

The suspension system for the bag roller is an important feature of the present invention.

In one embodiment the bag roller has an axle which is journaled for rotation in bearings or trunnions which are mounted in a fixed position on the vehicle frame so that the axis of rotation of the bag roller itself cannot move vertically with respect to the vehicle frame. In this embodiment of the suspension system an oscillation damping top roller is engaged with the top surface of the bag roller and is resiliently biased downward against the top surface of the bag roller with a selected, variable amount of force to thereby dampen the oscillation of the bag roller in a vertical direction as the vehicle moves over terrain of changing contour and/or attains increasing speed.

In another embodiment of a suspension system, the bag roller has an axle which is rotatable in the ends of a yoke or fork which is in turn pivotally connected to the vehicle frame so that the axis of rotation of the bag roller is maintained parallel to a related top roller and can move vertically with respect to the vehicle frame. In this embodiment a biasing mechanism forces the bag roller into increased engagement with the said top roller with a predetermined, variable amount of force.

An automatic inflation control mechanism is also associated with the suspension system which incorporates the yoke as described above. The automatic inflation control mechanism varies the pressure within the bag roller to compensate for changes in load and to thereby maintain an optimum operating shape for the bag roller. This automatic inflation control mechanism thus serves to help maintain an optimum footprint of the bag roller and also to maintain the optimum wrap around between the top of the bag roller and the lower part of the top drive roller under changing conditions of load applied to the bag roller.

In several specific embodiments of vehicles constructed in accordance with the present invention, the vehicle incorporates separate front and rear frame sections which are connected together for frame steering. The connection between the front and rear frame sections permits swinging movement (yaw) of one frame section with respect to the other about an axis which extends vertically through the connection. However, the connection between the two frame sections is constructed so that one frame section cannot bend horizontally (pitch) with respect to the other frame section. That is, one frame section cannot move upward or downward from a horizontal plane extending perpendicular to the vertical steering axis. This provides a strong back construction which has specific advantages in traversing off road terrain such as ditches, hummocks and the like. This strong back connection is particularly useful for permitting increased speeds of operation over terrain of this kind and with vehicles that have four or more bag rollers associated with one of the frame sections because it maintains the entire vehicle at more or less of a level attitude and prevents the vehicle itself undulating or pitching in a front to rear direction with the variations in terrain contour beneath the vehicle. This maintaining of a strong back, relatively level attitude of the overall vehicle helps to keep the load from pitching around on the vehicle, and the overall speed of the vehicle can therefore be maintained at a higher level than would be the case if relative bending between the two frame sections were permitted.

Off road vehicles and fluid-distensible, bag roller apparatus and methods which incorporate the structure and techniques described above and which are effective to function as described above constitute specific objects of this invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 4 also illustrates both a spring and snubber structure and an automatic pressure control valve structure associated with the yoke for the axle of the pneumatic bag roller. The spring and snubber provide regulation of the force with which the top drive roller engages the pneumatic bag roller as well as a snubbing of the oscillation of the bag. The automatic inflation and deflation valve provides regulation of the internal pressure within the pneumatic bag roller in response to changes in load applied to the pneumatic bag roller.

FIG. 5 shows details of the coaction between (1) a pneumatic bag roller having a cylindrical tread area and (2) a related top drive roller having a cylindrical area engaged with the cylindrical area of the pneumatic bag roller. The top drive roller includes anti-friction end caps which have a decreasing diameter in proportion to the changing circumference of the inflated bag in the shoulder area, which extend longitudinally beyond contact with the bag, and which are made of a material, such as Teflon or Nylon, for providing minimal friction when engaged with the rubber shoulder areas of the pneumatic bag roller under certain loading conditions of the vehicle.

FIG. 6 illustrates how flexing of the prior art bag caused a concentration of load, stress and wear at the ends of the prior art drive rollers.

FIG. 7 shows the pneumatic bag roller and top drive roller engaged without any appreciable amount of load applied to the pneumatic bag roller.

FIG. 12 is a front end elevation view of a pneumatic bag roller and top roller combination having a slip-on tread on the pneumatic bag roller. The slip-on tread is slipped onto the pneumatic bag roller while the bag roller is in a deflated or partially deflated condition and is retained in position by the circumferential expansion of the cylindrical portion of the pneumatic bag roller when the pneumatic bag roller is inflated. The slip-on tread is especially useful for providing added traction under certain operating conditions of the vehicle.

FIG. 13 is an end elevation view taken along the line and in the direction indicated by the arrows 13—13 in FIG. 12.

FIG. 14 is an isometric view of a pneumatic bag roller illustrating details of one type of construction (particularly the alignment and positioning of the longitudinal and circumferential cords).

FIG. 15 is a fragmentary, enlarged end view, taken generally along the line and in the direction indicated by the arrows 15—15 in FIG. 14, showing details of construction of the longitudinal cords in the shoulder area and side wall immediately adjacent to the hub of the bag. FIG. 15 illustrates that in the shoulder area (that portion of the bag as so labeled in FIG. 15) the circumferential cords have a minimum of overlapping (preferably no overlapping) and are aligned substantially radially to the axis of the pneumatic bag roller hub axle to provide maximum flexibility in the shoulder area.

FIG. 18 is a side elevation view of another embodiment of a pneumatic roller bag vehicle constructed in accordance with the present invention. The vehicle shown in FIG. 18 incorporates 8 pneumatic bag rollers, and each pneumatic bag roller is driven by a load carrying and torque transmitting top drive roller so that the vehicle is, in normal vehicle terminology, an 8×8 pneumatic bag roller vehicle. The vehicle shown in FIG. 18 incorporates two articulated frame sections which permit frame steering, and the articulated connections between the two frame sections prevents any front to back tilting of the two frame sections relative to one another (as best shown in FIGS. 21 through 23).

FIG. 19 is a top plan view of the vehicle shown in FIG. 18.

FIG. 20 is a front end elevation view of the vehicle shown in FIG. 18.

FIGS. 21, 22, and 23 are side elevation views showing how the front and rear frame sections are maintained horizontally aligned as the FIG. 18 vehicle traverses various types of terrain.

FIGS. 24 and 25 illustrate one example of how the pneumatic bag rollers of the present invention may be used in applications other than vehicles. FIG. 24 is a side elevation view and the pneumatic bag rollers and drive rollers employed in a pulling device for pulling pipes.

FIG. 25 is an elevation view of the apparatus shown in FIG. 24.

DESCRIPTION OF THE PREFERRED EMBODIMENTS

Figure 2:
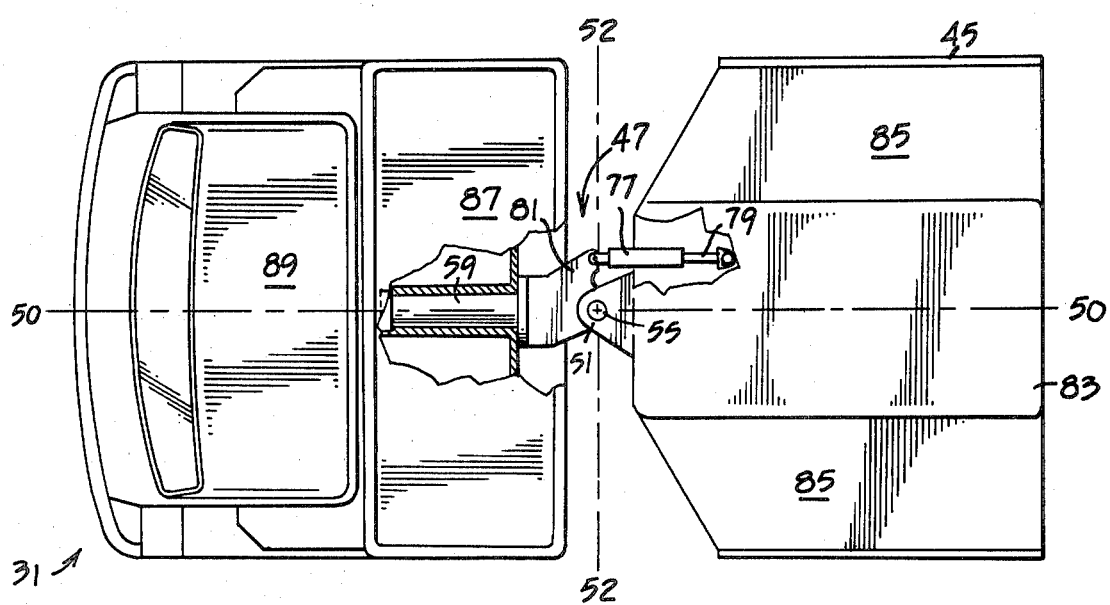
FIG. 2 is a top plan view of the vehicle shown in FIG. 1.
Figure 3:
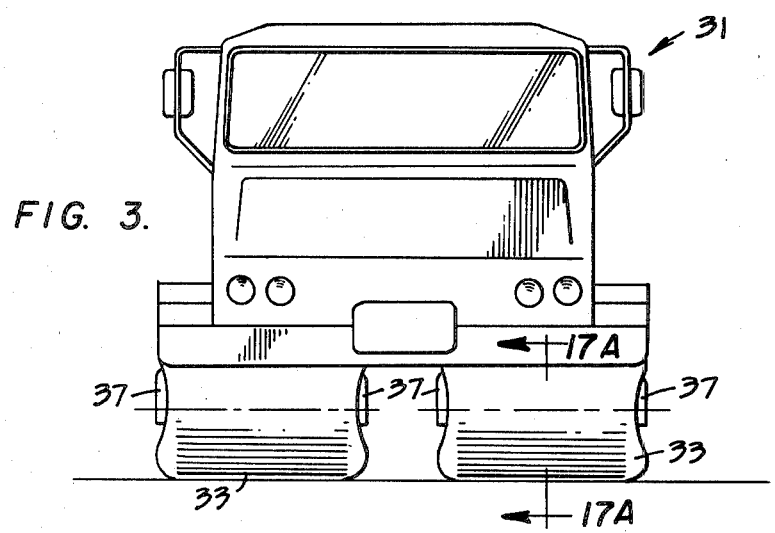
FIG. 3 is a front end elevation view of the vehicle shown in FIG. 1.
Figure 1:
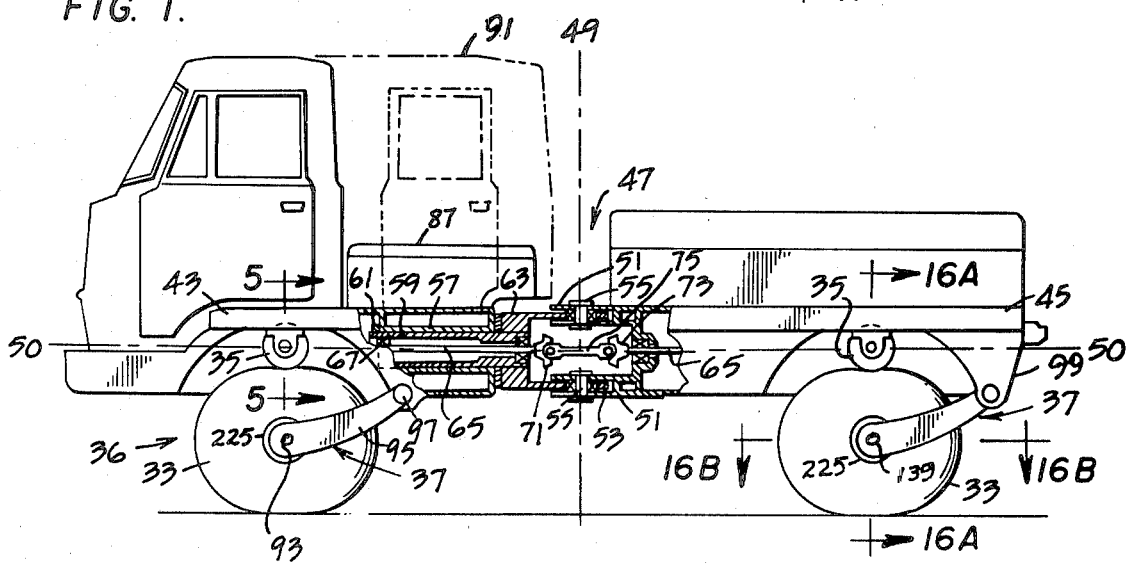
FIG. 1 is a side elevation view of a pneumatic bag roller vehicle constructed in accordance with one embodiment of the present invention. The vehicle shown in FIG. 1 incorporates four pneumatic bag rollers. Each of the pneumatic bag rollers in the FIG. 1 embodiment supports a load carrying and torque transmitting top drive roller, and each pneumatic bag roller also incorporates a floating axle. In normal vehicle terminology, the vehicle shown in FIG. 1 is a 4×4, pneumatic bag roller vehicle; and the vehicle has articulated frame steering with the engine located on the rear frame section. The dashed outlines in FIG. 1 illustrate how the cargo bed can be replaced with a modified cab to provide a crew cab or a sight-seeing cab.

A vehicle constructed in accordance with one embodiment of the present invention is indicated generally by the reference numeral 31 in FIGS. 1, 2 and 3.

The vehicle 31 incorporates four fluid-distensible, flexible-walled, ground-contacting and load-supporting rollers 33 (which will be hereafter referred to as pneumatic bag rollers 33).

In the FIGS. 1, 2 and 3 embodiment each pneumatic bag roller 33 supports a load carrying and torque transmitting top drive roller 35, and each pneumatic bag roller 33 also incorporates a floating axle which is held parallel and centered longitudinally beneath its top roller by a yoke 37. The top drive roller 35 is rotatably mounted on the vehicle frame and the yoke 37 is pivotally connected to the vehicle frame to form a suspension system 36 for the vehicle as will be described in greater detail below.

As best shown in FIGS. 1 and 2, the vehicle 31 is an articulated frame vehicle having a front frame section 43 and a rear frame section 45. The two frame sections are connected by an articulation connection 47. As described in more detail below the articulation connection has a hinge assembly (45, 51, 55, 53, 59, 63) which permits the frame section 43 to swing about a vertical axis 49—49 shown in FIG. 1 which is vertical to the frame section 45 and a swivel assembly (63, 59, 57, 43) which permits the frame section 43 to rotate or swivel about the longitudinal axis 50—50 of the internesting tubes 57, 59 as shown in FIG. 2 and in FIG. 1.

That is, the hinge structure of the connection 47, in combination with the internesting, axially extended tubes 57, 59 of the swivel assembly, prevent any pitching or bending of the frame sections about the transverse horizontal axis 52—52 which is parallel to frame 45 and shown in FIG. 2 so that the central longitudinal axis of each frame section is always maintained in a horizontal plane which is at right angles and perpendicular to the vertical hinge axis 49—49 and parallel to the frame 45.

It is an important feature of the present invention that the spacing and strength of the vertically spaced apart hinge elements 51 of the connection 47 are such that they will support the full loads imposed without any bending or tilting of the axes of the frame sections of the vehicle out of the common place referred to above. The connection 47 provides a "strong back" for the vehicle 31.

As best shown in FIG. 1, the connection 47 includes upper and lower hinge elements 51 connected fixedly to the frame section 45 and corresponding upper and lower hinge elements 53 connected fixedly (through a hinge frame element 63) to the tube 59.

The upper hinge element 53 is interleaved between two of the hinge elements 51, and the lower hinge element 53 is similarly interleaved between the lower two of the hinge elements 51.

Two hinge pins 55 are associated with the two sets of hinge elements 51 and 53. The axes of the hinge pins 55 are identical with the vertical axis 49—49.

The connection 47 also comprises a swivel assembly which permits the two frame sections to rotate relative to one another, and the swivel assembly includes an outer tube 57 and an inner tube 59 mounted for rotation within the outer tube 57. A retainer 61 is threaded onto the end of the tube 59 for retaining the tube in a fixed longitudinal relationship within the outer tube 57. The outer tube 57 is connected rigidly to the frame section 43 and the inner tube 59 is connected rigidly to the hinge element 63.

The hinge element 63 swings with respect to the frame section 45 through the pins 55, and the frame section 43 can rotate with respect to the hinge element 63 through the swivel connection provided by the tubes 57 and 59.

In the FIG. 1 embodiment, each of the top rollers 35 is driven, and the drive through the connection 47 is provided by a drive line 65 which may preferably be mounted in bearings 67 at opposite ends of the inner tube 59. The drive line 65 may also preferably have universal joints 71 and 73, as illustrated, on opposite sides of the axis 49—49 and interconnected by the splined coupling 75.

The steering of the vehicle is provided by causing one frame section 43 to swing with respect to the other frame section 45 about the vertical axis 49—49 shown in FIG. 1, and this is accomplished by a hydraulic ram 77–79 shown in FIG. 2. The cylinder of the hydraulic ram 77 is connected to a laterally extending steering arm 81 connected to the front frame section 43 and the piston rod 79 of the hydraulic ram is connected to the rear frame section 45. Extension or retraction of the piston rod 79 thus changes the angle between the longitudinal axes of the two frame sections to provide the steering.

For travelling across soft and unstable terrain, such as unpacked snow, loose sand, thawed tundra, or tule swamps, it is advantageous to have a pneumatic bag vehicle on which the front bags act as trail-breakers or trail blazers and exert a minimum unit pressure on the ground in order to gently compress and consolidate the surface material in preparation for the greater pressure exerted by succeeding bags.

A problem inherent with most prior art pneumatic vehicles is that the motor, transmission, cab, and driver are all located near the front end so that, when the vehicle is travelling in an unloaded condition without cargo, the front bags are more heavily loaded than the rear bags. The present embodiment, as described below, is a useful improvement in the pneumatic bag vehicle art.

The engine and transmission for the vehicle 31 are mounted on the rear frame section 45 within the engine and transmission housing 83 and are preferably centrally located as illustrated to provide side cargo beds 85.

The front frame section 43, in the specific embodiment illustrated in FIG. 2, also has a main cargo bed 87 behind the control cab 89. The cargo bed can be loaded to evenly balance the gross vehicle load between the front and rear bags.

As indicated in the dashed outline in FIG. 1, an alternative embodiment of the vehicle 31 can also incorporate a sight-seeing cab or crew cab 91 in place of the cargo bed 87.

Each pneumatic bag roller 33 is preferably an airfilled symmetrically shaped roller with an axis-defining hub 225 and axle 139 and with a highly flexible carcass throughout its tread shoulder, and sidewall areas, so constructed as to forcibly resist any movement of the hub axle away from an axially centered position in the bag. The bag carcass contains longitudinal and circumferential cords: longitudinal cords all of equal length and each with ends attached radially to the bag hub for centering the hub similar to the way bicycle spokes function in a bicycle wheel; circumferential cords in the tread to determine the circumferential shape of the bag and to interact non-stretchably with the top roller similar to the interaction between a conveyor belt and its driving pulley. These pneumatic bag rollers are preferably inflated at relatively low pressures (such as 2 psi to 5 psi) to conform to and cause minimum disturbance to the terrain over which the vehicle is driven.

The suspension system 36 of the present invention formed by the pneumatic bag rollers 33, top drive rollers 35 and yokes 37 is of a same general kind as illustrated and described in my prior U.S. Pat. Nos. 2,714,011 (now Reissue No. 24,272); 2,802,541; and 2,990,026, but incorporates some specific novel features and improvements which will be described in more detail below.

Figure 4:
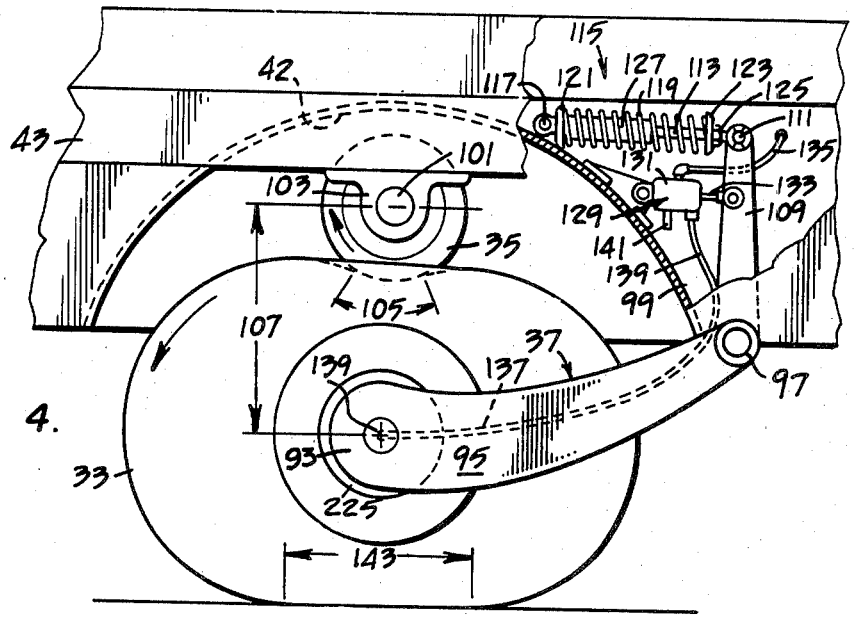
FIG. 4 is a fragmentary, enlarged side elevation view showing the pneumatic bag roller suspension structure of the vehicle shown in FIG. 1.

In the top roller driven, floating axle suspension system 36 for the vehicle 31 shown in FIGS. 1, 2 and 3, and as best shown in FIG. 4, the ends of the axle for each pneumatic bag roller 33 are mounted for rotation within bearings located in the lower ends 93 of side arms 95 of the yokes 37. The two side arms 95 of each yoke 37 are rigidly interconnected by a rear cross tube 97, and this cross tube 97 is in turn mounted for rotation within the lower ends of support members 99 rigidly connected to and forming parts of the related frame section 43, all as shown in FIG. 4.

As also shown in FIG. 4, the top drive roller 35 has an axle 101 with each end of the axle 101 mounted for rotation in a drive roller axle bearing mount 103 connected to a related frame section 43. See also FIG. 9.

The inner end of axle 101 of each top roller 35 is driven from the drive line 65 (See FIG. 1) by a differential gearing which is not illustrated.

Rotation of the drive roller 35 in the clockwise direction indicated by the arrow in FIG. 4 pulls the tread area of the bag from the right by wraparound friction and shoves the tread area to the left, similar to the action between a head pulley and conveyor belt. Internal air pressure expanding the bag lobe to the left pulls on the bag hub by means of longitudinal cords to cause movement of the vehicle to the left, all as indicated in FIG. 4.

The pneumatic bag roller 33 is maintained in an axially parallel and longitudinally centered position beneath the top drive roller 35 by means of the yoke 37, which is constructed to resist side forces imposed by sidehill and cornering operation and to allow the axle 139 of the pneumatic bag roller 33 to move vertically with respect to the axis of the top drive roller 35 and keep centered in the bag roller when the bag roller compresses or expands with changes in the contour of the terrain or with changes in the load on the vehicle or with changes of pressure within the pneumatic bag roller.

In normal off-highway operation, there has been found to be a preferred ratio of footprint length 143 to the nominal diameter of the pneumatic bag roller 33 with a corresponding amount of wraparound or extent of circumferential contact 105 between the pneumatic bag roller and the top drive roller 35. These preferred amounts of footprint length and corresponding wraparound are substantially independent of the amount of load carried by the vehicle 31 and transmitted through the drive roller 35 and are also a function of the vertical distance 107 between the axis of rotation of the pneumatic bag roller 139 and of the top drive roller 35.

The preferred amount of wraparound 105 and footprint length 143 varies in dependence upon the operating conditions of the vehicle 31. For example, at relatively high speed operation of the vehicle 31 on a smooth, hard surface such as a highway, the preferred amount of footprint and corresponding wraparound 105 would be somewhat less than the amount of footprint and corresponding wraparound 105 that would be preferred for operations of the vehicle 31 over soft sand or rocky terrain at slow vehicle speeds.

There is also a relationship between the amount of the wraparound 105 and the footprint with which the pneumatic bag roller 33 engaged the ground, as represented by the longitudinal distance 143 in FIG. 4. Under normal conditions of operation the total friction of the footprint area 143 is greater than the total friction of the wraparound area 105 because of the weight of the bag, hub, and yoke arms. The objective is to increase the friction in the wraparound 105 to ensure that the bag will slip in the footprint 143 before permitting the drive roller to slip on the bag at the wraparound area 105.

When the vehicle in FIG. 4 is driven to the left, the top roller pulls on the tread area which encircles the right hand lobe of the bag and allows the tread area which encircles the left hand lobe to be expanded by the internal air pressure, thus forcing the bag hub to be pulled to the left by means of the hub-centering longitudinal-radial bag cords. The bag hub in turn pulls horizontally to the left on the parallel yoke arms 37 causing a resultant upward component of force or bias between the bag 33 and the top roller 35, due to the downward sloping angle between the axis of the yoke trunnion 97 and the axis of the bag 139 in relation to the horizontal frame 43. This bias force adds to or supplements the force applied by the vehicle load through the top roller 35 to the wraparound area 105 on the pneumatic bag 33 without adding to the load applied to the footprint area 143, and might be compared to the increased pressure which a person applies to the bottom of his foot when he pulls upwards on his boot straps.

The bias forcing of the bag upwards toward the top roller also increases the length of the wraparound 105. However, at the moment of vehicle startup, especially when starting on a grade, the automatic yoke arm biasing force described above may not come into play immediately nor be sufficient to prevent wraparound slip before footprint slip. It is therefore advantageous to provide an additional adjustable biasing means to produce increased pressure against, and wraparound of, the driving top roller 35 to prevent slipping between the top roller and the bag before the bag slips on the ground. The present invention provides means for providing an adjustable, pre-set bias to the yoke 37 that will balance the weight of the bag, hub, and yoke and produce the desired amount of extra pressure and wraparound 105. This biasing means incorporates, as illustrated in FIG. 4, an arm 109 which is rigidly connected at its lower end to the cross tube 97 of the yoke. The upper end of the arm 109 is pivotally connected, by a pivotal connection 111, to a rod 113 of a spring and shock absorber assembly 115. The other end of the spring and shock absorber assembly 115 is pivotally connected, by a pivotal connection 117, to the related frame section 43 or 45.

As illustrated in FIG. 4 a spring 119 is held under compression between two end plates 121 and 123, and the position of the end plate 123 with respect to the rod 113 is adjustable by means of an adjusting nut 125. Turning the nut 125 to the left, as viewed in FIG. 4, increases the compression on the spring 119, and this in turn acts through the bell crank provided by the arm 109 and the side arms 95 to force the floating axle of the pneumatic bag roller 33 upward toward the fixed axle 101 of the top drive roller 35 and to produce a greater amount of wraparound 105.

The biasing spring 119 provides an adjustment for insuring the desired amount of wraparound but does not of course itself totally determine the force with which the top drive roller is engaged with the bag roller. The spring only adds an additional force over the force exerted by the weight of the vehicle.

The spring 119 also serves another function which becomes important and significant in the case of a tandem bag arrangement as shown in FIG. 18. In this case, the spring acts as a limiter for limiting the amount to which the yoke and bag roller 33 can swing or drop downward away from the top drive roller, such as can happen when the bag passes over a ditch which is wider than the bag roller, as shown in FIG. 23.

The preferred construction incorporates an arch-shaped housing 42. This arch-shaped housing provides the operating clearance for the bag roller 33 and the top drive roller 33 free of obstruction by the housing itself, and this arch-shaped housing also provides a smooth surface which minimizes the tendency of foreign matter, such as mud, sticks, snow and the like, from building up or becoming lodged above the bag roller 33 and in the area of the top drive roller 35.

This arch-shaped housing 42 also shields the resiliant biasing and dampening mechanism 115.

The arch-shaped housing also provides the maximum of strength with the minimum of structural material to maintain the correct alignment of the top roller, yoke, and bag combination.

The spring and shock absorber assembly 115 includes a shock absorber piston 127 and this shock absorber piston 127 coacts with the piston rod 113 to dampen or snub oscillation of the vertical movement of the pneumatic bag roller axle with respect to the top drive roller.

While a specific spring and shock absorber assembly has been illustrated for providing an adjustable pre-set bias and snubbing action, other biasing, snubber constructions (such as, for example, a torque rod and rubber sheath within the cross tube 97 of the yoke) can also be used.

As noted above, the preferred amount of ground contact footprint 143 is proportional to the vertical distance 107, and this vertical distance 107 also is proportional to a specific angle of the arm 109 with respect to the frame section 43 or 45.

The distance 107 can be changed by changing the air pressure within the pneumatic bag roller 33. Higher pressures increase the distance 107 and lower pressures decrease the distance 107. A greater load also decreases the distance 107.

Thus, to compensate for a greater applied load, the air pressure within the pneumatic bag roller 33 can be increased to restore the desired amount of footprint length 143, and the present invention provides an automatic air pressure regulating means responsive to the angular position of the arm 109 with respect to the related frame section 43 or 45 for increasing or decreasing the air pressure within the pneumatic bag roller 33 to maintain the desired vertical distance 107 and preferred amount of footprint length 143 regardless of the amount of load carried by the vehicle 31.

The control valve 131 is well-known to the vehicle art, particularly as a means to automatically regulate the air pressure in the air springs on highway buses and trucks. The control valve incorporates an adjustable time delay action between the time of the movement of the sensing rod 133 and the time of opening the valve to permit air to flow into the bag. The purpose of the time delay action is to delay operation of the air valve when the bag passes briefly over humps or ditches as illustrated in FIGS. 21, 22 and 23.

This automatic pressure regulating valve means is indicated generally by the reference numeral 129 in FIG. 4 and comprises a housing 131 and a sensing rod 133 which is pivotally connected at its outer end to the arm 109 and which is connected to a control valve within the housing 131. The conduit 135 carries pressurized air to the housing 131. A conduit 137 extends from the valve housing 131 to a fitting at one end of the pneumatic bag roller axle 139 for conducting air to and from the control valve within the housing 131. An exhaust line 141 vents air from the conduit 137 to atmosphere under the control of the control valve within the valve housing 131.

The air is admitted to the interior of the bag roller 33 through an opening in a rotary valve seal at the end of the bag roller axle. The air passes into the hollow axle. The side walls of the hollow axle are perforated to admit air into the interior of the pneumatic bag roller.

In operation of the automatic pressure regulating valve means, as the load on the vehicle 31 is increased, the arm 109 moves in a clockwise direction to pull the control rod 133 outward of the housing 131. This in turn, after the before mentioned time delay, positions the control valve within the housing 131 to connect the pressure conduit 135 with the conduit 137 and to cause the air pressure in the pneumatic bag roller 33 to increase until the arm 109 is restored to a position where the predetermined vertical distance 107 for the desired amount of footprint 143 is produced, and in this angular position of the arm 109 the control valve within the housing 131 is closed off.

If the load on the vehicle 31 decreases, the arm 109 rotates counterclockwise (as viewed in FIG. 4) to move the control valve, after the before mentioned time delay, to bleed the air from the conduit 137 to atmosphere through the exhuast conduit 141 until the predetermined amount of footprint 143 is again produced (as represented by the angular position of the arm 109).

In order to get the circumferential wraparound 105 shown in FIG. 4, the top surface of the pneumatic bag roller 33 must also be depressed into a configuration which is concave in a plane extending through the axis of the axle for the pneumatic bag roller 33 and the axle for the top drive roller 35. This concavity is indicated by the reference numeral 143 in FIG. 5. That is, the configuration of the top surface of the pneumatic bag roller immediately below the top roller 35 is depressed and flexed downward to the concave configuration 143 as contrasted to the most vertically distended outline 145 of the pneumatic bag roller in front of and behind the drive roller 35. Thus, the part of the bag beneath the outer end portions of the top drive roller 35 are concavely curved both longitudinally and circumferentially of the bag 33 as a consequence of producing the circumferential wraparound 105 shown in FIG. 4. This concave curvature 143 must make a transition to the convex curvature, indicated generally by the reference numeral 147 in FIG. 5, of the shoulder area and end wall of the pneumatic bag roller 33. The bag surface where the transition from the concave curvature 143 to the convex curvature 147 is made is a critical surface of the bag.

Figure 5:
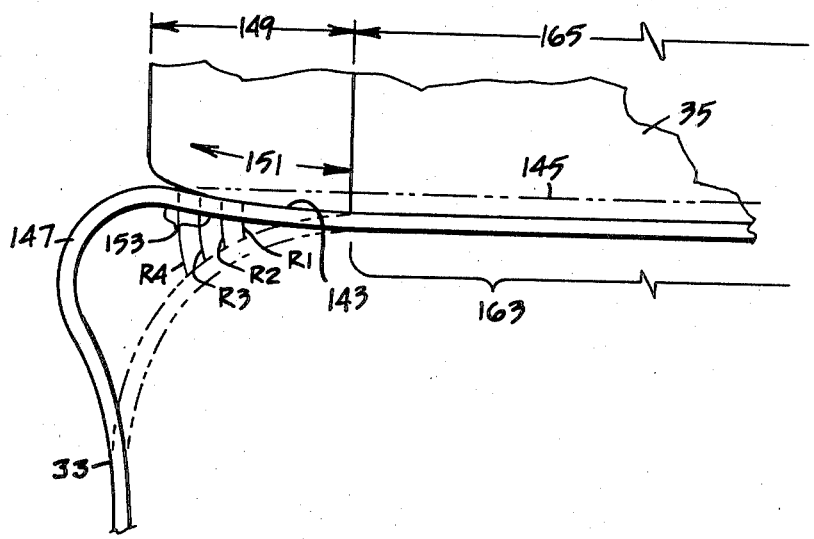
FIG. 5 is a fragmentary enlarged view taken along the line and in the direction indicated by the arrows 5—5 in FIG. 1.

The transition from longitudinally extending contact between the ends of the top drive roller 35 and the bag 33 has to extend longitudinally with reference to the longitudinal axis of the drive roller 35 as viewed in FIG. 5, beyond the transition from the concave curvature 143 to the convex curvature 147 of the bag roller 37 or else a condition of excess wear on the bag 33 will result. That is, as viewed in FIG. 5, the end portion 149 of the drive roller 35 must continuously engage the bag 33 longitudinally over the distance 151 and preferably extends beyond the area of transition (indicated by the reference numeral 153 in FIG. 5) between the concave curvature 143 and the convex curvature 147.

The important feature is to accommodate the curve that the rubber naturally wants to take and then to fit the roller end cap to that curve.

If the transition is not properly made, sliding movement back and forth of the bag carcass with respect to the end of the drive roller 35 in a longitudinal direction (as indicated by the double-ended arrow 157 in FIG. 6) will result. That is, with continued reference to FIG. 6, if the carcass is forced to gap apart and away from contact with the end portion of the top drive roller (as indicated by the gap 159 in FIG. 6), rapid and excessive wear will be produced by greatly increased unit pressure by the end edge 161 of the top drive roller 35 and can result in severe longitudinal scuffing back and forth by this edge, in the direction indicated by the arrows 157, on the shoulder of the bag 33.

Some of the prior usage of pneumatic bag rollers 33 (in vehicles made and operated and using bag rollers like the bag rollers 33) has tended to increase the thickness of the tread and shoulder rubber 160 of the pneumatic bag roller and also has tended to increase the number of plies of cord 162 making up the carcass of the pneumatic bag roller in attempts to overcome this excessive wear at the junctures 161 at the ends of the top drive rollers and the pneumatic bag rollers. Increasing the rubber thickness has, in fact, aggravated the condition because rubber is relatively noncompressible and greater thicknesses of the shoulder rubber therefore resist bending across the ends 161 and force the bag to gap at 159.

The problem of excessive wear because of the longitudinal scuffing of the edge of the drive roller is a problem which exists for both crowned bags and cylindrical bags, and the construction of the present invention which eliminates that scuffing is not limited to cylindrical bags but can also be applied to a crowned bag.

Figure 6:
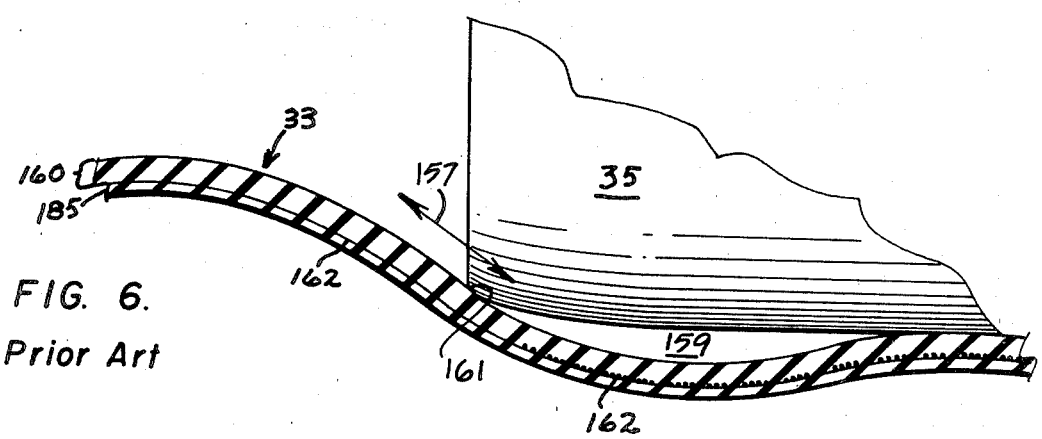
FIG. 6 is a view like FIG. 5 but showing problems encountered with the prior art type of construction.

The present invention overcomes the problem of the gap 159 which has been present in some of the prior art and prior usage (as illustrated in FIG. 6) by providing (a) both enough flexure in the carcass and tread of the pneumatic bag roller 33 and (b) a specific configuration of the ends of the drive rollers 35 which is interrelated to the deflected configuration of the pneumatic bag roller 33 so as to prevent the formation of a wear inducing gap 159 as illustrated in FIG. 6 and resulting longitudinal scuffing of edges 161 of the drive roller on the pneumatic bag roller surface.

In one specific embodiment of the present invention the pneumatic bag roller 33 has a cylindrical tread area. That is, the central part of the pneumatic bag roller 33 is constructed to form a cylinder when inflated. This cylindrical tread area is indicated by the reference numeral 163 in FIG. 5.

The top roller 35 has a corresponding cylindrical area as indicated by the reference numeral 165 in FIG. 5.

In FIG. 5 the bag roller 33 as inflated and without load is shown in dashed outline, and the deflection of the shoulder area and sidewall of the bag under maximum load is shown by the solid outline in FIG. 5.

The top roller 35 has, as noted above, an end cap 149 constructed of an anti-friction material with respect to rubber, such as Teflon or Nylon. The end cap 149 also has a diameter which decreases in proportion to the changing circumference of the inflated bag roller 33 in the shoulder area as shown by the relationship of the radii lines R1, R2, R3 and R4 in FIG. 5.

While a specific, cylindrical tread bag roller and top roller construction has been illustrated, the end cap construction and configuration are equally advantageous in relation to the bag roller having a crowned tread area rather than a cylindrical tread area.

As illustrated in FIG. 5, the anti-friction end cap 149 preferably extends up to the point at which the cylindrical area 165 of the top roller 35 begins.

Figure 9:
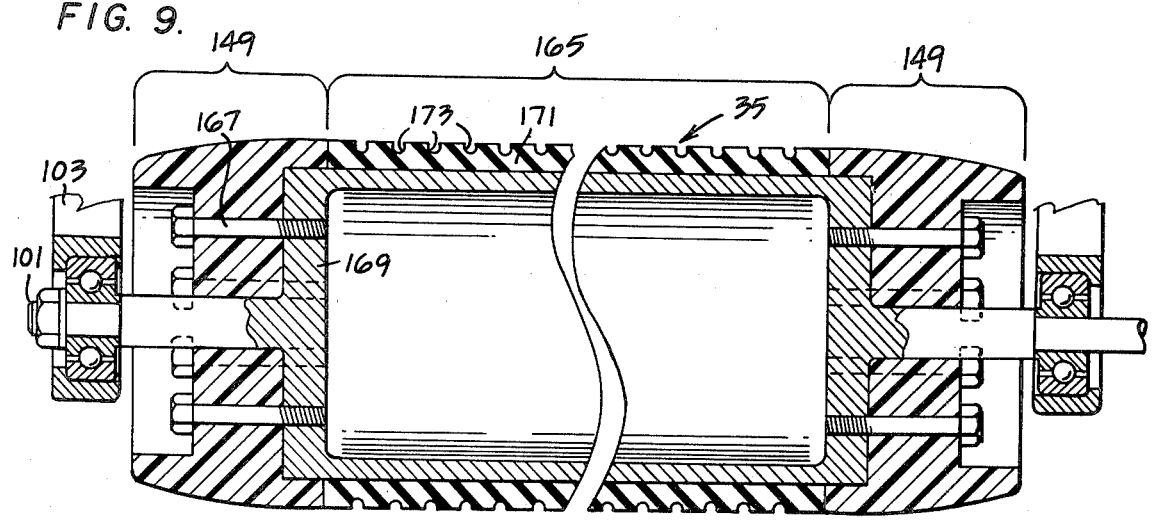
FIG. 9 is a fragmentary enlarged, cross-sectioned view showing details of construction of the top drive roller and replaceable anti-friction end cap.

As best shown in FIG. 9 the end cap 149 can be made removable or replaceable.

In the FIG. 9 embodiment the end cap 149 is mounted to the top roller 35 by a number of cap screws 167 which extend through a flange of the end cap and seat within an end wall 169 of the top roller 35.

As also illustrated in FIG. 9, the cylindrical area 165 of the top roller 35 is coated or bonded with a material having a high coefficient of friction with the material of the pneumatic bag roller 33. In a preferred form this material 171 is a rubber material.

Also, this coated area 171 of the top roller 35 can be preferably formed with a number of annular or spiral grooves 173 to allow moisture or slick material to pass through these grooves and to preserve the high frictional contact between the top roller and the pneumatic bag roller.

The construction of the ideal pneumatic bag roller 33, particularly the construction of the bag carcass, is an important feature of the present invention.

The internal pressure within the pneumatic bag roller 33 may vary within the range of 1 to 10 lbs. per square inch, depending upon the vehicle load and the operating conditions; and the bag roller must have a highly flexible sidewall, particularly in the shoulder area.

This highly flexible quality of the shoulder area is required in order that the pneumatic bag roller can accommodate the severe curvilinear flexure that occurs each quarter revolution of the bag roller under certain conditions of load and certain conditions of operation of the vehicle. This severe flexure is illustrated and will be described in more detail below with specific reference to FIG. 16 of the drawings.

The highly flexible sidewall allows for the high speed deformation with a minimum of stress points.

The preferred carcass construction for the pneumatic bag roller has circumferential cords in the tread area only; and if more than one ply is required, the circumferential cords are disposed immediately adjacent each other in plies in a radial direction and are not interspersed with longitudinal cords inbetween the plies of circumferential cords.

All of the sidewall cords are, as much as possible, completely radial to the bag axis. Further, all sidewall cords are disposed in the same plane, again as much as possible from a practical standpoint.

In the preferred pneumatic bag roller construction all of the sidewall cords are continuous from one bead to the opposite bead. That is, there are no splices to create stress areas.

If more than one ply of sidewall cords is required, then all of these plies are immediately adjacent to each other in a radial or longitudinal sense to minimize the section effect of the multiple plies.

The rubber coating in the sidewall and shoulder areas is a relatively thin rubber coating to facilitate reverse, or concave, flexing in the shoulder area.

Furthermore, in the preferred pneumatic bag roller construction the rubber coating in the tread area is also relatively thin. A thin rubber coating in the tread area gives the desired terrain hugging action with minimum abrasion by permitting extreme flexing of the tread area.

Cords made of steel cord or Aramid material provide a high degree of puncture resistance and are a preferred cord material.

FIGS. 14 and 15 illustrate features of the preferred pneumatic bag roller construction as noted generally above.

FIG. 14 shows one method of making a pneumatic bag roller 33.

As shown in FIG. 14 the bag is built up around an inner form which comprises a number of segmented plates 179. Each segment 179 contains air openings 181 which aid in the curing of the rubber of the bag. The openings 181 also function to prevent any kind of a build up of gas between the plates and the bag carcass which is being cured.

The segment plates 179 are removed through the hub opening 183 of the bead 188 of the cured bag roller 33.

In the construction of the pneumatic bag roller 33, the first step, after assembling the segmented male building mold plates 179, is to lay on a thin layer 185 of air impervious material, such as 1/16th inch butyl rubber.

The next step is to place a layer or layers 187 of longitudinal-radial cords.

As used in this application the term "rubber" includes all rubbers and elastomers used in tire construction, and the term "cord" includes all cords such as Rayon, Nylon, Polyester, Fiberglass, wire, Aramid, etc.

Actually, the preferred construction is to wind individual longitudinal rubber coated cords side by side so that each cord is in a plane common with the longitudinal axis 189—189 of rotation of the pneumatic bag roller 33.

This radial winding insures that there is no overlap in the shoulder area. There is a build up of the longitudinal cords with adjacent cords as these cords approach the bead at the hub opening 183.

The most preferred method of constructing the pneumatic bag roller 33 is to also wind the circumferential cords in one continuous winding operation, starting from one shoulder area and continuing across the tread area to the other shoulder area.

As a practical matter, winding operations of this kind require elaborate and expensive winding mechanisms, and FIG. 14 therefore illustrates an alternate method which achieves most of the desired results but uses a minimum of construction equipment.

The next step, in making the pneumatic bag roller 33 according to the method illustrated in FIG. 14 is therefore to lay a continuous layer of cord material about the circumference and with all cords oriented longitudinally. Each end of this layer of cord material extends axially beyond the tread area far enough so that it can be wrapped around the bead for adequate anchorage.

These end portions are slit back to the tread area to form the individual strips 187 of the shoulder area and sidewall. These strips 187 have a uniform, predetermined length marked for exact wraparound at the bead 188.

By slitting the end portions to form the individual strips 187, each strip 187 can be aligned radially with respect to the axis 189—189. With this construction there is some single overlapping (as indicated by the areas 193) and also some possible multiple overlapping (as indicated by the areas 195 in FIG. 15).

Even though there is some overlap as illustrated in FIG. 15, the heavier areas of overlap occur in the sidewall portions near the hub opening 183 and do not occur in the shoulder area, where flexibility is critical. The preferred maximum angle of overlap between the circumferential cords (or strips) with relation to one another and approaching the bead area is less than 15 degrees.

To achieve perfect concentricity of the bag carcass, all longitudinal cords must be of equal length from bead to bead.

Because the length of the sheet containing the longitudinal cords is pre-measured and consistent, all longitudinal cords are essentially of equal lenght from bead to bead; and this is an important feature of the present invention because it maintains the concentricity of the bag carcass.

In another embodiment of the invention, the longitudinal radial cords are pleated and gathered at and approaching the bead area, rather than being slit and overlapped as illustrated in FIGS. 14 and 15. In this alternative embodiment the cords essentially do not cross each other at an angle but become bunched up in parallel fashion to each other so that each cord is working directly radially to the axis 189—189. This pleated, rolled and stitched construction to form the cords into tightly compacted, parallel dispositions more nearly approaches the radial winding, described as the most preferred embodiment above; and in a specific embodiment the cords are pleated at a maximum depth of 4 cords per pleat at the bead area.

The next step is to put on the circumferential cords in the tread area 163. The circumferential cords can be put on as a single sheet having a width equal to the cylindrical area and a length (cut diagonally) slightly greater than the circumference (so as to provide the necessary overlap). A diagonally cut strip of the same width as the overlap is applied diametrically opposite to provide dynamic balance at high speed.

As an alternate method, the sheet containing the circumferential cords is split into a number of individual strips 192. These strips 192 are applied such that laps 194 are distributed equally about the circumference of the bag roller 33. This helps with dynamic balancing of the bag roller 33 which becomes important when a large diameter bag is operated at relatively high rates of rotation.

Only one layer of circumferential cords is illustrated in FIG. 14. If a second layer of circumferential cords is required, the second layer of cords is applied immediately on top of the first layer so as to maintain the two layers of circumferential cords as close together as possible in a radial direction and to thereby preserve the flexibility of the tread area.

A relatively thin tread or scuff coat 197 is then applied to the entire outer surface of the bag roller carcass with the joints of the tread sheet skived together in a joint having complementary tapered ends to minimize build up of thickness of the coating at the joint. As noted above, it is important that there be no build-up of the tread material in the shoulder area.

The bag roller construction illustrated in FIG. 14 and described above accomplishes the objective of forming a bag roller 33 which has the desired high degree of flexibility, particularly in the shoulder area, with a minimum of stress areas. The bag construction described also accomplishes the objective of having all cords working in tension when the bag is inflated and under load and torque.

The advantages of this construction will now be described with reference to FIGS. 16 and 17.

Figures 16, 17:
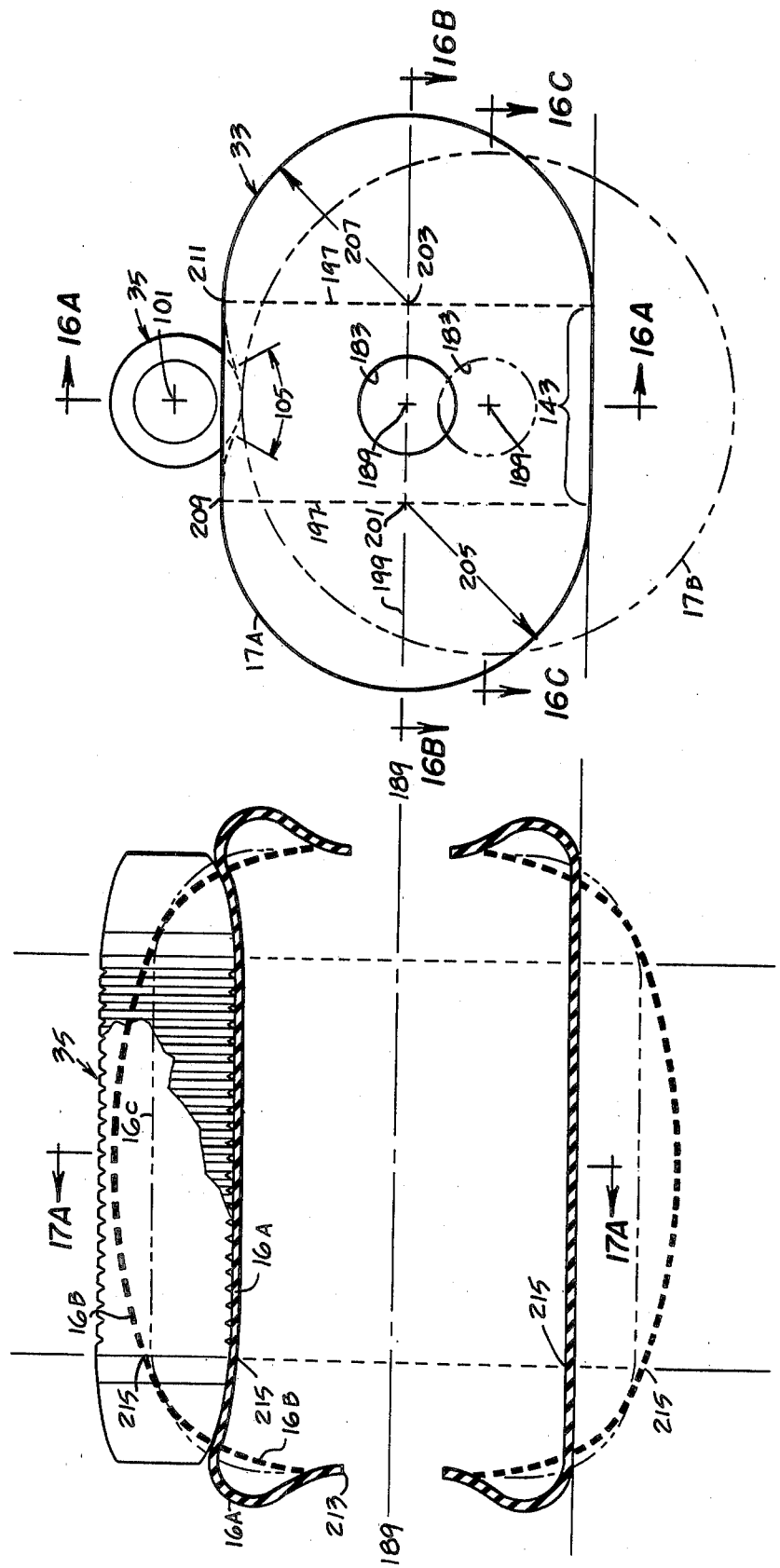
FIG. 16 is a composite cross-sectional view showing how the pneumatic bag roller side wall and shoulder area flexes every quarter turn of the pneumatic bag roller between the plan view outline configuration shown in dashed outline and the elevation view configuration shown in solid outline in FIG. 16. The solid line outline 16A in FIG. 16 illustrates a cross section through the pneumatic bag roller and top roller taken along the line and in the direction indicated by the arrow 16A—16A in FIG. 1 and in FIG. 17. The dashed line outline 16B in FIG. 16 illustrates the configuration of the cross section through the bag taken along the line and in the direction indicated by the arrows 16B—16B in FIG. 1 and in FIG. 17. The chain dashed outline 16C in FIG. 16 (indicated by the reference characters 16C) indicates the constructed shape of the pneumatic bag roller without any load applied as taken along the line and in the direction indicated by the arrows 16C—16C in FIG. 13 (assuming the slip-on tread of FIG. 13 is not present).
FIG. 17 is a composite, side elevation view showing cross sections through the pneumatic bag roller and top roller with the bag loaded (solid outline 17A) and with the bag unloaded (chain dashed outline 17B). The cross section configuration showing the bag loaded (solid outline 17A) is taken along the line and in the direction indicated by the arrows 17A—17A in FIG. 3 and in FIG. 16. The unloaded bag cross section (chain dashed outline 17B) is taken along the line and in the direction indicated by the arrows 17B—17B in FIG. 12 (assuming that the slip-on tread is not in place).

FIG. 17 is a composite, side elevation view showing cross sections through the pneumatic bag roller and top roller with the bag loaded (solid outline 17A) and with the bag unloaded (chain dashed outline 17B).

The cross section configuration showing the bag loaded (solid outline 17A) is taken along the line and in the direction indicated by the arrows 17A—17A in FIG. 3 and is also taken along this same line as indicated in FIG. 16.

The unloaded bag cross section (the chain dashed outline 17B) is taken along the line and in the direction indicated by the arrows 17B—17B in FIG. 12 (but showing only the bag roller proper without the slip-on tread. The chain dashed outline 17B of FIG. 17 thus shows the bag roller configuration with the bag roller distended but unloaded.

With the bag roller 33 loaded under substantially maximum load as shown by the solid outline 17A in FIG. 17, the tread portion of the bag roller engages the ground tangentially with the footprint of length 143.

Another important objective of the present invention is to construct the bag rollers to obtain the maximum amount of wrap around 105 of the bag roller 33 around the top roller 35.

A number of interesting relationships result from a bag roller 33 constructed to achieve these two objectives.

For example, the vertical lines extending upward from the front and back limits of the footprint 143 intersect a plane 199 extending horizontally through the bag roller axis 189 at points 201 and 203 and these points correspond substantially with the center of curvature of the bag roller in front of and behind the top drive roller 35. That is, the part of the bag roller 33 extending in front of the drive roller 35 has a generally uniform radius 205 centered on the point 201 and extending from the forward edge of the footprint 143 up to a high point 209 and on to tangency with the top roller at the end of the wrap around 105. Similarly, the part of the bag roller 33 behind the top drive roller 35 has a substantially uniform curvature having a radius 207 centered at the point 203 and extending up from the back edge of the footprint 143 up to the point on the top of the bag and on to tangency with the top roller at the back end of the wrap around 105.

While these relationships are not always precisely as illustrated in FIG. 17, the relationships are generally like that shown in FIG. 17 when the bag roller 33 is properly manufactured to embody the various features described above with relation to FIGS. 14 and 15.

The wraparound 105 of the bag roller 33 on the top drive roller 35 is in many respects analogous to the driving action of a driving pulley on a conveyor belt, in which case wraparound is of vital importance to frictionally transmit the driving force.

Further, the desirability of a large footprint 143 is to permit distributing large loads with a minimum ground bearing pressure concentration.

A very important feature of the bag roller 33 of the present invention is that the bag roller construction provides a flexibility in the tread area 143 itself which enables the footprint area 143 to conform to the ground surface and to irregularities in the ground surface to in fact achieve a maximum uniform distribution of load over the entire area of the footprint with minimal localized concentration of the load at any point within the tread area.

The present invention, by conforming to the terrain, takes advantage of the granular structure which is in the terrain rather than tearing up the granular structure. Tearing up the granular structure unnecessarily results in less traction than is potentially available if the shear strength of the granular structure is preserved in an undisturbed surface.

FIG. 16 is (like FIG. 17) a composite cross-sectional view. FIG. 16 shows how the pneumatic bag roller sidewall and shoulder area flex every quarter turn of the pneumatic bag roller between the configuration shown in the solid outline and the configuration shown in the broken outline in FIG. 16. The solid line outline 16A in FIG. 16 illustrates a vertical cross section through the pneumatic bag roller 33 and top roller 35 taken along the line and in the direction indicated by the arrows 16A—16A in FIG. 1 and also along the line 16A—16A in FIG. 17.

The dashed line outline 16B in FIG. 16, illustrates the configuration of a horizontal cross section through the bag roller 33 taken along the line and in the direction indicated by the arrows 16B—16B in FIG. 1 and also along the line 16B—16B in FIG. 17.

For further purposes of illustration a chained dashed outline 16C if shown in FIG. 16 to indicate the constructed shape of the pneumatic bag roller 33 without any loads applied. The outline 16C is taken along the line and in the direction indicated by the arrows 16C—16C in FIG. 13 (assuming the slip-on tread has been removed) and also along the line 16C—16C of FIG. 17.

The main purpose of showing the composite cross section outline configurations 16A and 16B in FIG. 16 is to illustrate how the sidewall and shoulder area of the bag roller 33 (that part of the bag between the point 213 at the bead and the point 215 at the transition between the shoulder area and the tread area) must flex from the solid line outline 16A to the dashed line outline 16B illustrated in FIG. 16 each time that part of the bag turns one quarter of a revolution between (a) engagement with either the top roller 35 or engagement with the ground and (b) rotation to a position where that part of the bag is aligned in the horizontal plane extending through the bag roller axis 189—189.

As is clearly evident from the composite cross-sectional views 16A and 16B in FIG. 16 this part of the bag roller 33 (and the part of each longitudinal cord extending between the points 213 and 215 in the bag carcass) is subjected to extreme and repeated flexure when the bag is operated at maximum load; and the bag must be constructed to accommodate this flexure without the development of excessive stress or wear.

Figure 7:
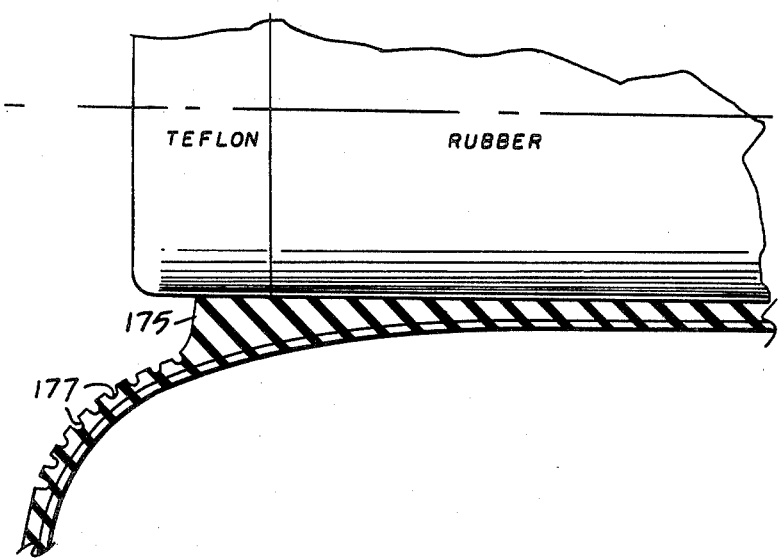
FIG. 7 is a view like FIG. 5 but showing an alternate form of pneumatic bag roller having a built up shoulder area for extending the cylindrical portion of the bag beyond the cylindrical structure of the bag carcass for enhancing high speed operation on highways.

FIG. 7 illustrates a modified form of pneumatic bag roller 33 and top roller 35 in which the pneumatic bag roller 33 has a built up shoulder 175 for extending the cylindrical tread area of the bag roller 33 beyond the cylindrical structure of the pneumatic bag roller carcass for enhancing high speed operation on highways. FIG. 7 shows the pneumatic bag roller and top drive roller engaged without any appreciable amount of load applied to the pneumatic bag roller.

The built-up shoulder 175 acts, in combination with increased internal pressure in the bag roller 33, to prevent the shoulder areas of the pneumatic bag roller 33 from dragging on the pavement. That is, the internal pressures used in the bag roller 33 for operation of the bag roller 33 on highways is preferably higher than that normally used for operation of the bag roller 33 off highway, and this higher internal pressure produces, in combination with the built-up shoulder area 175 a footprint area which effectively minimizes any engagement of bag roller 33 with the highway outside the side edges of the tread area of the bag roller 33.

Figure 8:
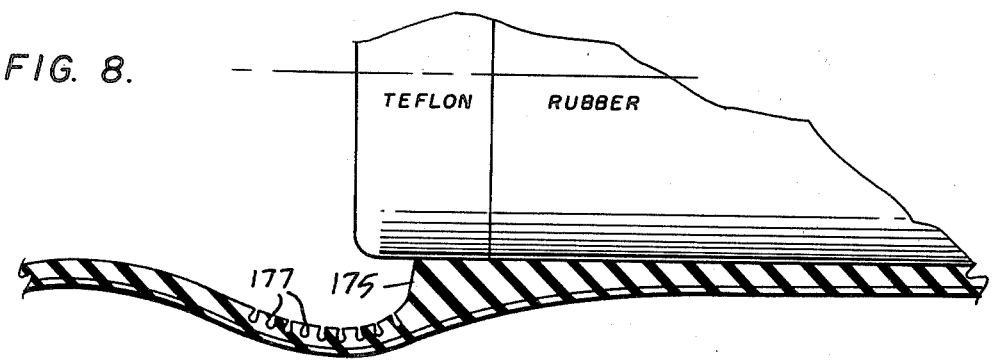
FIG. 8 is a view like FIG. 7 but showing the flexure of the shoulder area of the pneumatic bag as can occur under certain operating conditions of the vehicle.

FIG. 8 is a view like FIG. 7 but showing the flexure of the shoulder area of the pneumatic bag as can occur under certain operating conditions of the vehicle. This shoulder area may be formed with a number of annular grooves 177 as illustrated in FIG. 8 to facilitate extreme reverse bending action of the bag carcass in this area under certain extreme loads or operating conditions.

In some situations it may be desirable to provide a ground engaging surface on the pneumatic bag roller 33 which will provide greater resistance to slippage than the smooth surface of the existing tread area.

For example, some type of grouser action might be desired under certain conditions or operations, such as operation on a warm or melting snow surface.

Another example is a situation in which there is a fluid film on the ground surface which could cause hydroplaning between the ground and the pneumatic bag roller. In some situations the tread area of the pneumatic bag roller is grooved circumferentially to provide channels for accommodating the liquid film and to permit the other non-grooved areas of the pneumatic bag roller tread to grip the ground bearing surface.

The same effect is also obtained by providing a slip-on tread for the pneumatic bag roller. The slip-on tread has practical, economic advantages in that the slip-on tread is produced at a relatively low cost and can be removed when not required, and no relatively expensive modification of the bag tread area itself is required.

In this respect, the slip-on tread of the present invention is somewhat analogous to using tire chains on a conventional wheeled tire in so far as the tire chains are used only for a temporary condition and the tire itself is not modified to permanently incorporate the tire chain.

FIGS. 12 and 13 illustrate one embodiment of the present invention which incorporates a slip-on tread. In the FIGS. 12 and 13 embodiment the slip-on tread is a tread which has a large number of relatively small, articulated flaps. The flaps lie flat against the pneumatic bag roller except when the tread area of the bag engages the ground bearing surface. At that point the articulated flaps swing radially outwardly about the connected edge to provide a highly directional acting grouser effect.

As illustrated in FIG. 12, a slip-on tread 217 extends circumferentially around the tread area 163 of the pneumatic bag roller. The slip-on tread 217 can be formed as a rectangular strip which is zipped together by a zipper 219 or the slip-on tread 217 can be made as an integral annular cylindrical tube. In this latter case, the pneumatic bag roller 33 is deflated sufficiently to slip the tube over the bag roller. The pneumatic bag roller 33 is then inflated to its minimum operating pressure or to a greater operating pressure, and this inflation of the bag roller carcass 33 distends the bag roller 33 sufficiently to hold the slip-on tread 217 securely in place.

The slip-on tread 217 shown in FIGS. 12 and 13 includes a large number of small flaps 221 each of which is connected at one edge to the body of the slip-on tread 217 and each of which is free to swing outward at the opposite edge, as illustrated in FIG. 13. In one embodiment the flaps 221 are rubber and are preferably overlapped in a shingle-type pattern as illustrated.

Also, all of the flaps are connected to the belt at corresponding edges so that the flaps fold flat as they pass between the top roller 35 and the pneumatic bag roller 33. Engagement of the free edges of the flaps 221 with the soft ground bearing surface, such as wet snow or certain types of soft mud, permits and causes the free edges of the flaps 221 to swing outward to a sufficient extent to provide a grouser effect; and the grouser effect is, as illustrated in FIG. 13, directional in nature so as to tend to contain the ground surface material in a wedge between flap 221 and the tread area of the bag roller 33.

Other slip-on tread configurations (such as, for example, a grooved slip-on tread as noted generally above or very shallow, herring-bone type grousers or even very short hair-like projections) can be incorporated in the slip-on tread constructions.

While not illustrated in the drawings, a light, hook-on, or slip-on chain net or plastic web, open-type chain can also be used in place of the slip-on tread 217.

The top drive roller 35 and the flexibility of the pneumatic bag roller 33 easily accommodate a supplementary chain net of this kind.

The supplementary chain net need not be as wide as the entire tread area 163 of the bag roller 33, but, in most cases, need only be a relatively narrow width such as, for example, 1 to 2 feet wide for a pneumatic bag roller 33 that might be several feet long as measured from hub opening to hub opening.

The flap-type slip-on tread shown in FIGS. 12 and 13 has benefits when the vehicle 31 is operated in a floating condition in water. In this case the flaps 221 function as paddles much like the paddles in a paddle wheel boat for providing forward propulsion.

Figure 10:
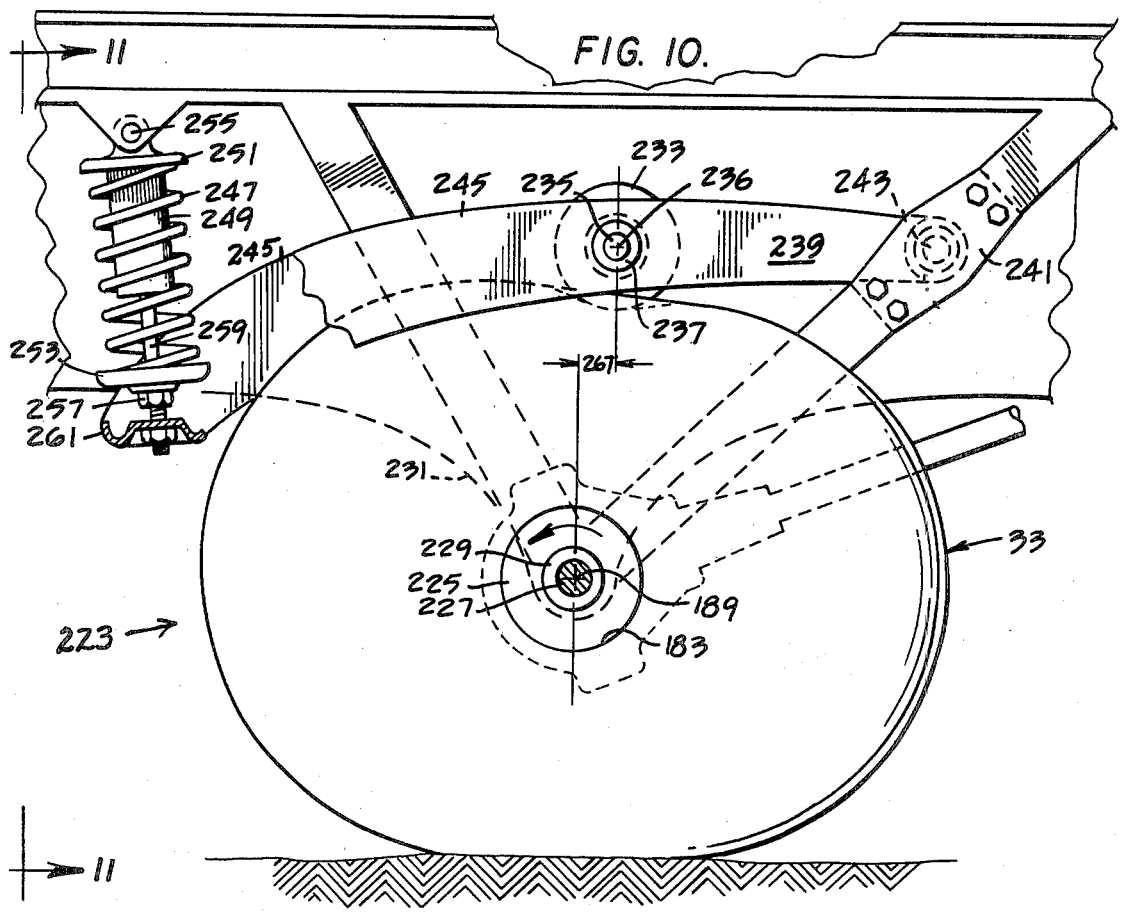
FIG. 10 is a fragmentary, enlarged side elevation view showing details of an alternate form of pneumatic bag roller suspension constructed in accordance with the present invention and usable with the FIG. 1 vehicle.
Figure 11:
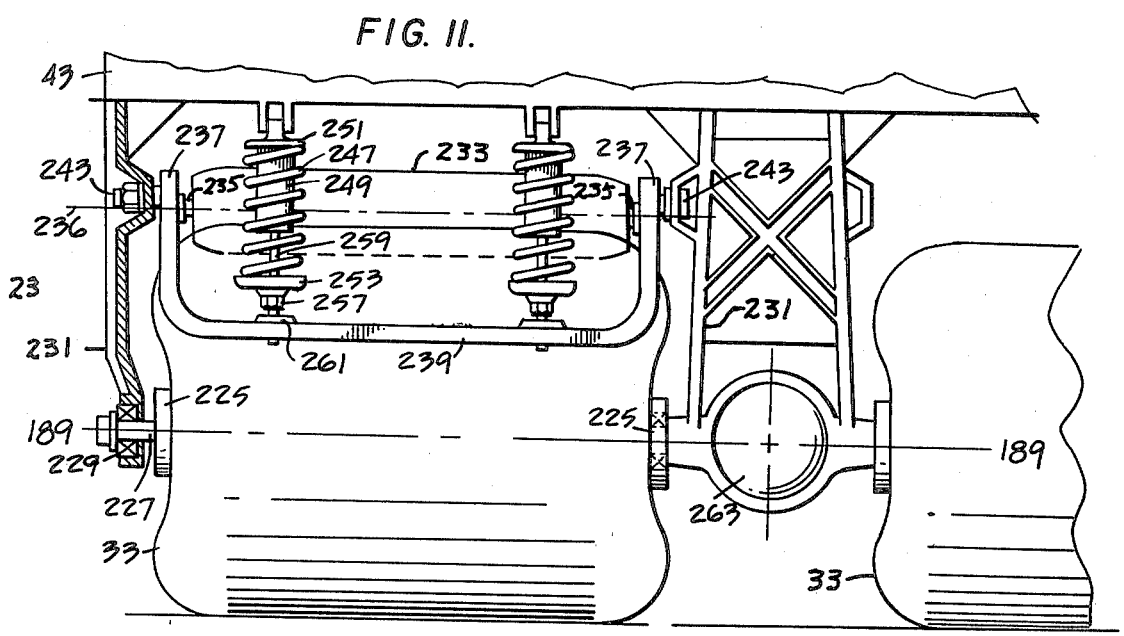
FIG. 11 is a front elevation view taken along the line and in the direction indicated by the arrow 11—11 in FIG. 10. In the FIGS. 10 and 11 embodiments the axle trunnion for the pneumatic bag roller axle is fixed, and the drive is transmitted through the axle of the pneumatic bag roller rather than through the top roller. The top roller, in the FIGS. 10 and 11 embodiment, is bias mounted by a structure which provides oscillation dampening of the pneumatic bag roller.

FIGS. 10 and 11 show details of an alternate form of pneumatic bag roller suspension constructed in accordance with the present invention and usable with the vehicle 31 shown in FIG. 1 and also usable with other vehicles, such as the 8 by 8 vehicles described below and illustrated in FIGS. 18-23.

The pneumatic bag roller suspension shown in FIGS. 10 and 11 is indicated generally by the reference numeral 223.

An important objective of the suspension 223 shown in FIGS. 10 and 11 is to provide a method to dampen the oscillations of a bag which is mounted on a fixed axle on the vehicle frame.

In prior applications of bag rollers mounted on fixed axle trunions the speed of the vehicle has been severely limited because the bags bounced excessively when going over uneven terrain.

This often resulted, as a practical matter, in limiting the vehicle speed to not more than 20 miles per hour.

The suspension 223 of the present invention makes it possible to increase the speed of the vehicle by providing a suspension system which suppresses or dampens the bounce or oscillation of the bag roller.

The suspension 223 incorporates a fixed axle trunion for the pneumatic bag roller axle, and the drive is transmitted through the axle of the pneumatic bag roller rather than through the top roller as in the pneumatic bag roller suspension previously described and illustrated in FIGS. 1-4 and FIGS. 16 and 17.

The fixed trunion bag roller axle and oscillation dampening top roller suspension 223 shown in FIGS. 10 and 11 replaces the floating bag roller axle and fixed top drive roller suspension 36 shown in FIGS. 1-4.

The suspension 223 shown in FIGS. 10 and 11 includes (like the suspension 36 shown in FIGS. 1-4) a pneumatic bag roller 33. However, in the suspension 223, the longitudinal axis 189 of the bag roller 33 is held fixed with respect to frame 43.

The bag roller 33 in the FIG. 10 embodiment (like the bag roller 33 in the FIGS. 1-4 embodiment) has a hub 225 at each end of the bag roller, and a bag roller axle 227 is secured to the hub 25. However, in the FIG. 10 embodiment, the bag roller axle 227 is mounted for rotation in trunions 229 which are in turn mounted on the vehicle frame 43 by mounting frames 231, rather than being mounted for floating action by the yoke 27 as in FIGS. 1-4.

The suspension 223 includes an oscillation dampening roller 233 engaged under a regulated load with the top surface of the bag roller 33. The roller 233 has an axle 235 mounted for rotation in a trunion 237, and the trunion 237 is in turn mounted within a yoke 239. Support plates 241 and pivot pins 243 mount one end (the right hand end as viewed in FIG. 10) of the yoke 239 for pivotal rotation on the vehicle frame 43.

The connected end of the arms which form the yoke 239 is free to move vertically with respect to the frame 43 under a resiliantly applied force and snubbing action provided by springs 247 and shock absorbers 249. Each spring 247 is a coil spring, and a pair of spring retainers 251 and 253 retain the springs in place. The top spring retainer 251 is pivotly connected to the frame 43 by a pivot 255. The lower retainer 253 is adjustable to increase or decrease the amount of force exerted by the spring 247 on the outer end of the yoke 239. This adjustment comprises an adjustment nut 257 threaded on to the lower end of rod 259 of the shock absorber 249. The lowermost end of rod 259 is connected to a plate 261 which is secured to the yoke 239.

In one embodiment of the suspension 223 as shown in FIGS. 10 and 11, the drive to the bag roller 33 is transmitted entirely through the axle 227 and hubs 225. In this embodiment, drive axles and a differential housing 263 are disposed between each pair of bag rollers 33 and are supported on the vehicle frame by the support structure 231 shown in FIG. 11. The drive to the differential 263 is supplied by the drive line 65 shown in FIGS. 1 and 10 and in a preferred embodiment the front and rear differentials 263 are also interconnected by a third differential.

In the embodiment of the suspension 223 in which the entire driving torque is transmitted through the bag axles 227, the oscillation dampening top rollers 233 are coated preferably made of an anti-friction material such as Teflon or Nylon since these rollers are not relied on to transmit any driving torque to the bag rollers 33.

The vehicle load is applied to the bag rollers 33 primarily through the bag axles 227, but a substantial amount of the load (up to about 50% of the total load) can also be applied to the top of the bag rollers 33 by the oscillation dampening rollers 233. The amount of load applied through the oscillation dampening rollers 233 is determined by the adjustment of the amount of the resiliant bias exerted on the end of the yoke 239. Thus, adjusting the nuts 257 to move the lower spring retainers 253 upward increases the amount of load applied through the oscillation dampening roller 233 and correspondingly decreases the amount of load applied through the ends 227 of the bag roller axle.

The combination of the load applied by the spring 247 and the snubbing action provided by the shock absorber 249 effectively suppresses excessive bouncing and excessive oscillation or bouncing of the fixed axle trunion bag roller 33 in the suspension 223. As a result, the vehicle 31 using the suspension 223 can be operated at relatively high speeds without incurring excessive and uncontrolled bounce of the large volume, low pressure bag rollers 33.

The horizontal and vertical positioning of the trunion 237 in each side arm 245 of the yoke 239 is preferably adjustable (by adjustment screws or shims not illustrated in FIGS. 10 and 11) to accommodate different vehicle loads and/or different terrain conditions and to provide a measure of fine tuning of the matching of the position of the oscillation dampening roller 233 to the adjustable biasing force and snubbing action provided by the spring 247 and shock absorber 249.

The location of the axis 236 of the oscillation dampening roller 233 is, however, preferably maintained horizontally offset (as indicated by the numeral 267 in FIG. 10) to the rear (as referred to the direction of travel of the vehicle 31) of the axis 189 of the related bag roller 33. This facilitates higher speed operation of the vehicle 31 because it positions the oscillation dampening roller 233 such that this oscillation dampening roller 233 tends to roll "downhill" on the indented upper surface of the bag roller 33. That is, this positioning of the oscillation dampening roller 233 places the larger lobe of the indented upper surface ahead of the roller 233 and the smaller lobe of the indented upper surface of the bag roller 33 behind the roller 233; and the roller 233 consequently does not have to continually climb up the larger, higher lobe as the vehicle 31 moves forward (to the left as viewed in FIG. 10) and as the bag roller 33 rotates in a counterclockwise direction (as viewed in FIG. 10).

In another embodiment of the suspension 223 the torque for driving the bag roller 33 is transmitted to the oscillation dampening roller 233 (by gearing not illustrated in FIGS. 10 and 11) rather than being transmitted to the bag roller axle 227. In this case the outer surface of the roller 233 is provided with a high friction material in the tread area of the bag roller 33.

In another embodiment of the suspension 223, driving torque is transmitted through both the bag roller axle 227 and the oscillation dampening roller 233.

The trunion 237 for the roller 233, in another embodiment, is mounted in a fixed position with respect to the vehicle frame 43 rather than being mounted in the yoke 239 as illustrated. In this embodiment the horizontal and vertical position of the axis 236 of the oscillation dampening roller 233 is adjustable to provide the location of the oscillation dampening roller 233 best suited for a particular application to which the vehicle 31 is put.

While only a single top roller 233 has been illustrated, multiple oscillation dampening top rollers 233 can be utilized; however, in most instances a single oscillation dampening roller 233 is preferable.

The action of the oscillation dampening top roller 233 not only dampens the vertical oscillation of the pneumatic bag roller 33, but also, in the process, divides the oscillation horizontally fore and aft.

While the oscillation dampening roller 233 has been illustrated in FIG. 11 as extending across the entire longitudinal length of the tread area of the bag roller 33, useful oscillation dampening results can be obtained with an oscillation dampening roller 233 that is of lesser length or with a roller that is divided into segments; however, again the preferred embodiment is that illustrated in FIG. 11 and shaped as in FIG. 5.

FIGS. 18-23 show another embodiment of the pneumatic bag roller vehicle constructed in accordance with the present invention.

In each of these figures the vehicle is indicated generally by the reference numeral 32. The vehicle 32 incorporates eight pneumatic bag rollers 33.

The 8 by 8 construction shown in FIGS. 18-23 provides a suspension using a number of bags 33 which is comparable to and which achieves the results of a suspension using much larger bags 33.

The 8 by 8 construction utilizes the bags in a way such that the effective front to rear footprint provided by the bags covers the same effective length as a huge bag many times the size of the tandem pairs of bags. This is best illustrated in FIG. 23. As shown in FIG. 23 the 8 by 8 tandem suspension absorbs the spans irregularities in terrain such as ditches and rocks and humps.

The tandem suspension bags do not absorb large rocks as well as a single larger bag, but the tandem bags do quite effectively provide a spanning operation and function to permit increased speed of the vehicle in many types of terrain.

To achieve the spanning function effectively with pairs of tandem bags, the vehicle 32 utilizes the particular articulated connections between two frame sections as shown and described in the FIG. 1 embodiment. That is, articulated frame sections permit steering, and the articulation between the frame sections is such that the frame sections can swivel and swing but cannot bend longitudinally with respect to one another. The strong back or non-bending feature of the articulated frame sections is also desirable for successful absorbing of rocks by the tandem bags. The strong back, non-bending feature enables the load to be transported smoothly on either frame section. Without the non-bending feature, the load is subject to violent pitching forwardly and rearwardly.

The preferred embodiment of the vehicle 32 shown in FIGS. 18–23 is an articulated frame vehicle having (like the vehicle 31 shown in FIGS. 1–3) a front frame section 43 and a rear frame section 45 connected by a connection 47. The connection 47 for the vehicle 32 shown in FIGS. 18–23 is basically the same as the corresponding connection 47 for the vehicle 31 shown in FIGS. 1–3. This connection 47 permits the rear frame 45 to swivel and to swing with respect to the front frame section 43 but does not permit the rear section 45 to bend with respect to the front frame section 43. This connection 47 will not be further described at this point, but reference can be made to the details of the connection 47 as shown in FIGS. 1–3.

The vehicle 32 incorporates 8 pneumatic bag rollers 33.

The tandem bag configuration shown in FIG. 18 preferably uses the floating axle suspension rather than the fixed axle suspension for the bag rollers 33. The floating axle suspension permits the maximum bag extension and compression, and this maximum amount of bag extension and compression provides an effective substitute for the normal walking beam type suspension that is often used with a wheeled vehicle in a tandem wheeled 8 by 8 vehicle configuration. An axle loaded pneumatic bag vehicle provides only about half of this effect. This becomes more significant with more unevenness of the terrain.

The bag roller 33 does need to have some sort of retaining structure to prevent the bag from swinging completely down from the top roller, and this retaining structure is provided by the resilient biasing construction as shown in FIG. 4, or it can, of course, be provided by a simple stop or chain for the yoke.

In the preferred embodiment, the suspension for each bag roller 33 provides a floating axle for the bag roller 33 and a drive by means of a torque transmitting top roller 35. However, as noted above, the vehicle 32 can utilize the suspension 223 shown in FIG. 10 in which the axle 227 in the bag roller 33 is fixed and the top roller is an oscillation dampening roller like the roller 233 illustrated in FIG. 10 and described in detail above.

The tandem bag configuration shown in FIG. 18 preferably uses the floating axle suspension rather than the fixed axle suspension for the bag rollers 33, because the floating axle suspension permits the maximum bag extension and compression, and this maximum amount of bag extension and compression provides an effective substitute for the normal walking beam type suspension that is often used with a wheeled vehicle in a tandem wheeled 8 by 8 vehicle configuration. An axle loaded vehicle provides only about half of this effect, so that the axle loaded vehicle is not as preferred as the floating axle vehicle. This becomes more significant with more unevenness of the terrain.

The bag roller 33 does need to have some sort of retaining structure to prevent the bag from swinging completely away from the top roller, and this retaining structure is provided by the resilient biasing construction as shown in FIG. 4, or it can, of course, be provided by a simple stop or chain for the yoke.

In the preferred embodiment, the suspension for each bag roller 33 provides a floating axle for the bag roller 33 and a drive by means of a torque transmitting top roller 35. However, as noted above, the vehicle 32 can utilize the suspension 223 shown in FIG. 10 in which the axle 227 in the bag roller 33 is fixed and the top roller is an oscillation dampening roller like the roller 233 illustrated in FIG. 10 and described in detail above.

It should also be noted that the other alternative embodiments of the suspension 223 as described in detail with reference to FIGS. 10 and 11, can also be used with the vehicle 32. That is, for example, the drive can be supplied entirely or in part by the oscillation dampening top roller.

In addition, it should be noted that all of the combinations of fixed bag axle, trunion mounting and fixed or floating top roller trunion mountings can be used in the vehicle 32.

However, the preferred suspension for the vehicle 32 is the suspension in which the axle for the bag roller 33 is incorporated in a floating mount like the yoke 37 shown in FIG. 4, because this suspension permits maximum use of the extension and compression of the bag roller 33 as illustrated by the difference between the solid outline and the chain dashed outline of the composite view of FIG. 17. That is, permitting the bag roller axle to float to the extent illustrated in FIG. 17 is preferable over having the bag roller axle held in a fixed position because the floating axle suspension makes use of the extension and compression of the bag roller 33 itself in a way that provides the same effect that a walking beam suspension for tandem wheels of a wheeled vehicle. This will become more apparent from the description to follow, particularly in reference to FIGS. 21–23.

The use of two bag rollers 33 in tandem in each side of each frame section, in combination with the non-bending connection 47 between the two frame sections, enables the tandem pair of bags to function substantially like a single huge bag roller 33 having a footprint equal in length to the distance which would include the footprints of the two bag rollers 33 in a tandem pair. Thus, the two tandem bag rollers 33 provide operational results which are equivalent to the operational results which would otherwise be obtained only by having a very large diameter bag which would increase the overall height and width of the vehicle 32 substantially.

While an 8 by 8 vehicle has been illustrated in FIGS. 18–23, it should be noted that a vehicle incorporating the tandem paired bags and strong-back frame section connection can incorporate more than four bag rollers 33 on one or both frame sections 43 and 45. Thus, the vehicle 32 can incorporate four bag rollers 33 on the front frame section 43 and six bag rollers 33 on the rear frame section 45. In this event, the effective footprint provided by the three tandem bag rollers 33 can provide an effective footprint span fore and aft equal or substantially equivalent to that produced by a single bag having a large enough diameter to provide a footprint equal in length to the overall distance between the beginning of the footprint for the first tandem bag and the end of the footprint for the last tandem bag in the three bag pair.

The primary advantage of having additional bag rollers 33 (over and above a tandem pair) is to provide additional flotation for the same width of vehicle and not so much to provide a more effective footprint action because the effective footprint action is in large part determined by the spacing between the axis of the front and rear bags in any pair whether it is a two bag pair, three bag pair or four bag pair.

FIGS. 21, 22 and 23 graphically illustrate the effectiveness of the increased footprint effect achieved by the paired bag rollers 33 and strong back connection 47.

As illustrated in FIG. 21, in traversing a crest of a hill, the bag rollers nearest the crest of the hill engage the ground; and the strong back, non-bending connection 47 prevents any bending between the frame sections, even though the leading and trailing bag rollers 33 are completely disengaged from the ground.

FIG. 22 illustrates the converse action when the vehicle 32 is traversing a gulley or bottom of the hill. In this event, the leading and trailing bag rollers 33 engage the ground while the intermediate bag rollers 33 are completely disengaged from the ground. In both the FIG. 21 and the FIG. 22 operations the tandem paired bag rollers 33, in combination with the non-bending connection 47, provide the same result as would be provided by a single bag roller 33 under each frame section large enough in diameter to maintain contact with the ground to the full extent of both leading and trailing bag rollers 33 of each frame section.

FIG. 23 illustrates the benefits of the tandem bag roller and non-bending frame connection when the vehicle is traversing ditches 281 wider than the diameter of the bag roller 33. In this case the spacing between the tandem bag roller 33 on each frame section enables the frame section to maintain a smooth and level course over such ditches, in the same way as the tandem bag roller suspension and non-bending frame connection smooth out the course of the vehicle over the crest of the hills and across the bottom of the gulleys as shown in FIGS. 21 and 22. Because each bag roller 33 is restrained in the extent to which it can swing away from the top drive roller 35, the vehicle 32 can traverse the terrain illustrated in FIG. 23 at relatively high speeds because of the bridging effect that is obtained.

All of the applications of the pneumatic bag rollers 33 as described above have been for vehicles in which the pneumatic bag rollers 33 are used to transport loads over many types of terrain.

However, the pneumatic bag rollers can also be used at fixed locations to convey objects with respect to the fixed location of the bag rollers, including objects with uneven or delicate surfaces. One embodiment of a device for producing this result is illustrated in FIGS. 24 and 25.

In FIGS. 24 and 25 the pneumatic bag rollers 33 and drive rollers 35 are embodied in a pulling device which is indicated generally by the reference numeral 283.

In the puller arrangement 283 illustrated in FIGS. 24 and 25, bag rollers 33 and drive rollers 35 are arranged in upper and lower pairs for providing a firm grip and propelling force on an elongated object (such as the pipe 285 illustrated in the drawings) to be transported or propelled.

The upper and lower paired bags 33 and drive rollers 35 shown in FIGS. 24 and 25 permits the pipe 285 to the transported, pulled or pushed through the device 283; and a substantial amount of laterally directed force can be exerted on the pipe 285. In addition, the amount of force exerted can be increased by stacking or positioning a number of devices 283 in line in the direction of movement of the pipe or other object 285.

Furthermore, in many applications, the upper bag roller 33 and drive roller 35, and the upper part of the frame assembly 287 can be dispensed with so that the object to be transported is supported and conveyed only by the lower bag roller 33; and in such applications, it is often desirable to mount the lower bag roller 33, drive roller 35 and frame 287 and associated drive motor 284 in a swivel mount which permits the direction of movement of the conveyed object to be changed.

It is also desirable, in some cases, to provide remote control of the swivel mount, so that the direction of movement of the conveyed object can be controlled from a remote location.

Multiples of such single lower units permit heavy sheet material or irregular shaped objects to be moved easily and in a desired direction.

In some applications the frame 287 is made mobile, as by adding wheels.

Objects having quite irregular shapes and configurations such as heavy girders are readily transportable by the conforming bag roller 33 when used in the conveyor apparatus described above.

Other examples of objects that can be readily accommodated by multiples of the conforming pneumatic bag roller 33 conveyor apparatus are huge ship sections.

The present invention also has particular application to objects which are quite fragile because the conforming bag roller 33 and the pneumatic characteristics of the bag roller 33 cushion and protect against breakage of the fragile object.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. An automatic inflation control system for a vehicle of the kind having a flexible-walled, fluid-distensible, load sustaining bag roller, said automatic inflation control system comprising, a vehicle frame, a flexible-walled, fluid-distensible, load sustaining bag roller disposed beneath the vehicle frame and mounted for rotation about an axis extending through opposite ends of the bag roller, a top roller mounted for rotation in trunnions attached to the vehicle frame and about an axis disposed parallel to the axis of rotation of the bag roller, said top roller being engaged with the top surface of the bag roller to apply a load to the bag roller, and automatic inflation control means for sensing the distance between the axis of rotation of the bag roller and the axis of rotation of the top roller and for varying the pressure in the bag roller by permitting compressed gas to enter or leave the bag roller and thus to maintain a predetermined, desired distance between said axes with all changes in load on the bag roller.

2. The invention defined in claim 1 including a yoke pivotally connected to the vehicle frame and to the axle of the bag roller and wherein the automatic inflation control means measure the angle of the yoke with respect to the vehicle frame.

3. The invention defined in claim 2 wherein the pneumatic bag roller has a mid-section and two opposite end sections, and including hub means in each end section for mounting the bag roller for rotation on said bag roller axle, said bag roller including carcass means for providing tensile reinforcement to the bag roller, said carcass means including at least one layer of longitudinal cords with each cord extending substantially radially to the hub means in the end sections and fastened at one end to one hub means and at the other end to the other hub means, said carcass means also including at least one layer of circumferential cords in the mid-section, and wherein said bag has an ideal shape under load in which the length, in the direction of travel, of the footprint of the part of the bag engaged with the ground is 15-40% of the total circumference of the bag in the mid-section, and wherein the automatic inflation control means sense the actual distance between the axis of rotation of the bag roller and the axis of rotation of the top roller and regulate the pressure within the bag roller to maintain a fixed volume of compressed gas within the bag roller with changes in load applied to the bag roller to thereby maintain said ideal bag shape.

* * * * *